(12) United States Patent
Diankov et al.

(10) Patent No.: US 10,703,584 B2
(45) Date of Patent: Jul. 7, 2020

(54) ROBOTIC SYSTEM WITH AUTOMATED PACKAGE REGISTRATION MECHANISM AND METHODS OF OPERATING THE SAME

(71) Applicant: MUJIN, Inc., Tokyo (JP)

(72) Inventors: Rosen Nikolaev Diankov, Tokyo (JP); Huan Liu, Tokyo (JP); Xutao Ye, Tokyo (JP); Jose Jeronimo Moreira Rodrigues, Tokyo (JP); Yoshiki Kanemoto, Tokyo (JP); Jinze Yu, Tokyo (JP); Russell Islam, Tokyo (JP)

(73) Assignee: MUJIN, Inc., Tokyo (JP)

( * ) Notice: Subject to any disclaimer, the term of this patent is extended or adjusted under 35 U.S.C. 154(b) by 0 days.

(21) Appl. No.: 16/539,790

(22) Filed: Aug. 13, 2019

(65) Prior Publication Data

US 2020/0130961 A1 Apr. 30, 2020

Related U.S. Application Data

(60) Provisional application No. 62/752,756, filed on Oct. 30, 2018, provisional application No. 62/852,963, filed on May 24, 2019.

(51) Int. Cl.
*B65G 61/00* (2006.01)
*B25J 9/16* (2006.01)
(Continued)

(52) U.S. Cl.
CPC ............ *B65G 61/00* (2013.01); *B25J 9/1687* (2013.01); *G05B 19/40935* (2013.01);
(Continued)

(58) Field of Classification Search
CPC ... B65G 61/00; B25J 9/1687; G05B 19/40935
See application file for complete search history.

(56) References Cited

U.S. PATENT DOCUMENTS 5,290,454 A 3/1994 Dorica et al.
6,290,454 B1 * 9/2001 Huang .................. B65G 47/90
294/119.1
(Continued)

FOREIGN PATENT DOCUMENTS

JP 03234491 A 10/1991
JP 07097057 A 4/1995
(Continued)

OTHER PUBLICATIONS

U.S. Patent Office Non-Final Office Action dated Apr. 18, 2019 for U.S. Appl. No. 16/290,741, filed Mar. 1, 2019, 20 pages.
(Continued)

*Primary Examiner* — Kim Y Vu
*Assistant Examiner* — Molly Delaney
(74) *Attorney, Agent, or Firm* — Perkins Coie LLP

(57) ABSTRACT

A method for operating a robotic system includes obtaining and processing first data representative of an object at a start location; obtaining additional data as the object is transferred to a task location, wherein the additional data includes information regarding one or more edges and/or one or more surfaces separate from portions of the object captured in the first data; and creating registration data representative of the object based on the additional data.

20 Claims, 13 Drawing Sheets

(51) Int. Cl.
  *G06Q 10/08* (2012.01)
  *G05B 19/4093* (2006.01)
(52) U.S. Cl.
  CPC . *G06Q 10/087* (2013.01); *G05B 2219/40006* (2013.01); *G05B 2219/40607* (2013.01)

(56) References Cited

U.S. PATENT DOCUMENTS

| | | | |
|---|---|---|---|
| 9,067,744 | B2 | 6/2015 | Takizawa et al. |
| 9,102,055 | B1 | 8/2015 | Konolige et al. |
| 9,272,417 | B2* | 3/2016 | Konolige ................. B25J 5/007 |
| 9,486,921 | B1 | 11/2016 | Straszheim et al. |
| 9,796,540 | B1 | 10/2017 | Shellenbaum et al. |
| 10,124,489 | B2* | 11/2018 | Chitta .................... B25J 9/1687 |
| 10,369,701 | B1 | 8/2019 | Diankov et al. |
| 10,562,188 | B1 | 2/2020 | Diankov et al. |
| 2002/0106273 | A1 | 8/2002 | Huang et al. |
| 2010/0222915 | A1* | 9/2010 | Kuehnemann ......... B65G 57/00 700/217 |
| 2015/0066199 | A1 | 3/2015 | Shimono |
| 2015/0203304 | A1 | 7/2015 | Morency et al. |
| 2015/0262012 | A1 | 9/2015 | Kim et al. |
| 2016/0016311 | A1* | 1/2016 | Konolige ................. B25J 5/007 700/245 |
| 2017/0137236 | A1 | 5/2017 | Sonoura et al. |
| 2017/0246744 | A1* | 8/2017 | Chitta .................... B25J 9/1687 |
| 2018/0126553 | A1* | 5/2018 | Corkum ................. B25J 9/1697 |
| 2018/0243904 | A1 | 8/2018 | Bradski |

FOREIGN PATENT DOCUMENTS

| | | |
|---|---|---|
| JP | 10031742 | 2/1998 |
| JP | 2894449 B2 | 5/1999 |
| JP | 2002013913 A | 1/2002 |
| JP | 3277739 B2 | 4/2002 |
| JP | 2003237943 A | 8/2003 |
| JP | 2006300929 A | 11/2006 |
| JP | 2007254128 A | 10/2007 |
| JP | 2013129034 A | 7/2013 |
| JP | 2017058130 A | 3/2017 |
| JP | 2017520418 A | 7/2017 |
| JP | 2018047544 A | 3/2018 |
| WO | 2017146895 A1 | 8/2017 |

OTHER PUBLICATIONS

U.S. Patent Office Notice of Allowance dated Jun. 7, 2019 for U.S. Appl. No. 16/290,741, filed Mar. 1, 2019, 8 pages.
U.S. Patent Office Non-Final Office Action dated Jul. 12, 2019 for U.S. Appl. No. 16/443,743, filed Jun. 17, 2019, 15 pages.
U.S. Patent Office Non-Final Office Action dated Jul. 15, 2019 for U.S. Appl. No. 16/443,757, filed Jun. 17, 2019, 16 pages.
U.S. Appl. No. 16/290,741, filed Mar. 1, 2019, Inventors: Rosen Diankov, Huan Liu, Xutao Ye, Jose Jeronimo Moreira Rodrigues, Yoshiki Kanemoto, Jinze Yu and Russell Islam, Applicant: Mujin, Inc.
U.S. Appl. No. 16/443,743, filed Jun. 17, 2019, Inventors: Rosen Diankov, Huan Liu, Xutao Ye, Jose Jeronimo Moreira Rodrigues, Yoshiki Kanemoto, Jinze Yu and Russell Islam, Applicant: Mujin, Inc.
Notice of Allowance dated Oct. 9, 2019 for U.S. Appl. No. 16/443,743.
U.S. Appl. No. 16/443,757, filed Jun. 17, 2019, Inventors: Rosen Diankov, Huan Liu, Xutao Ye, Jose Jeronimo Moreira Rodrigues, Yoshiki Kanemoto, Jinze Yu and Russell Islam, Applicant: Mujin, Inc.
Notice of Allowance dated Oct. 7, 2019 for U.S. Appl. No. 16/443,757, filed Jun. 17, 2019, 12 pages.
U.S. Appl. No. 16/667,857, filed Oct. 29, 2019, Inventors: Rosen Nikolaev Diankov, Huan Liu, Xutao Ye, Jose Jeronimo Moreira Rodrigues, Yoshiki Kanemoto, Jinze Yu and Russell Islam, Applicant: Mujin, Inc.
U.S. Appl. No. 16/667,822, filed Oct. 29, 2019, Inventors: Jinze Yu, Jose Jeronimo Moreira Rodrigues and Rosen Nikolaev Diankov, Applicant: Mujin, Inc.
U.S. Appl. No. 16/667,840, filed Oct. 29, 2019, Inventors: Jinze Yu, Jose Jeronimo Moreira Rodrigues and Rosen Nikolaev Diankov, Applicant: Mujin, Inc.
U.S. Appl. No. 16/667,882, filed Oct. 29, 2019, Inventors: Jinze Yu, Jose Jeronimo Moreira Rodrigues and Rosen Nikolaev Diankov, Applicant: Mujin, Inc.
Korean Intellectual Property Office, International Application Division, International Search Report and Written Opinion or PCT/US2019/035608 filed Jun. 5, 2018, dated Aug. 29, 2019, 9 pages.
Japanese Patent Office, Notice of Reasons for Rejection for Japanese Application No. 2019-133517, dated Nov. 18, 2019, with English translation, 6 pages.
U.S. Appl. No. 16/736,667, filed Jan. 7, 2020, Inventors: osen Nikolaev Diankov, Huan Liu, Xutao Ye, Jose Jeronimo Moreira Rodrigues, Yoshiki Kanemoto, Jinze Yu and Russell Islam, Applicant: Mujin, Inc.
International Search Report and Written Opinion dated Feb. 19, 2020 for PCT/US2019/058672 filed Oct. 29, 2019, ISA/KR, 10 pages.
International Search Report and Written Opinion dated Feb. 17, 2020 for PCT/US2019/058650 filed Oct. 29, 2019, ISA/KR, 12 pages.
International Search Report and Written Opinion dated Feb. 19, 2020 for PCT/US2019/058656 filed Oct. 29, 2019, ISA/KR, 9 pages.
International Search Report and Written Opinion dated Feb. 20, 2020 for PCT/US2019/058666 filed Oct. 29, 2019, ISA/KR, 10 pages.
International Search Report and Written Opinion dated Feb. 24, 2020 for PCT/US2019/058677 filed Oct. 29, 2019, ISA/KR, 9 pages.

* cited by examiner

ROBOTIC SYSTEM WITH AUTOMATED PACKAGE REGISTRATION MECHANISM AND METHODS OF OPERATING THE SAME

CROSS-REFERENCE TO RELATED APPLICATION(S)

This application claims the benefit of U.S. Provisional Patent Application Ser. No. 62/752,756, filed Oct. 30, 2018, and further claims the benefit of U.S. Provisional Patent Application Ser. No. 62/852,963, filed May 24, 2019, both of which are incorporated by reference herein in their entirety. This application is also related to U.S. patent application Ser. No. 16/290,741, filed Mar. 1, 2019, now U.S. Pat. No. 10,369,701, and is incorporated herein by reference in its entirety.

TECHNICAL FIELD

The present technology is directed generally to robotic systems and, more specifically, to systems, processes, and techniques for registering objects.

BACKGROUND

Often times, packages are palletized for shipment to a destination where they are de-palletized. Sometimes, they are de-palletized by human workers which can be expensive and risks bodily injuries. In industrial settings, de-palletizing operations are often performed by industrial robots such as a robotic arm that grips, lifts, transports, and delivers the package to a release point. Also, an imaging device may be employed to capture an image of a stack of packages loaded on the pallet. A system may process the image to ensure the package is efficiently handled by the robotic arm, such as by comparing the captured image with a registered image stored in a registration data source.

On occasion, the captured image of a package may match a registered image. As a result, physical characteristics (e.g., measurements of a package's dimensions, weight, and/or center or mass) of the imaged objects may be known. Failure to correctly identify the physical characteristics can lead to a variety of unwanted outcomes. For example, such failure could cause a stoppage, which may require manual registration of the package. Also, such failure could result in a package being mishandled, especially if the package is relatively heavy and/or lop-sided.

DETAILED DESCRIPTION

Figure 1:
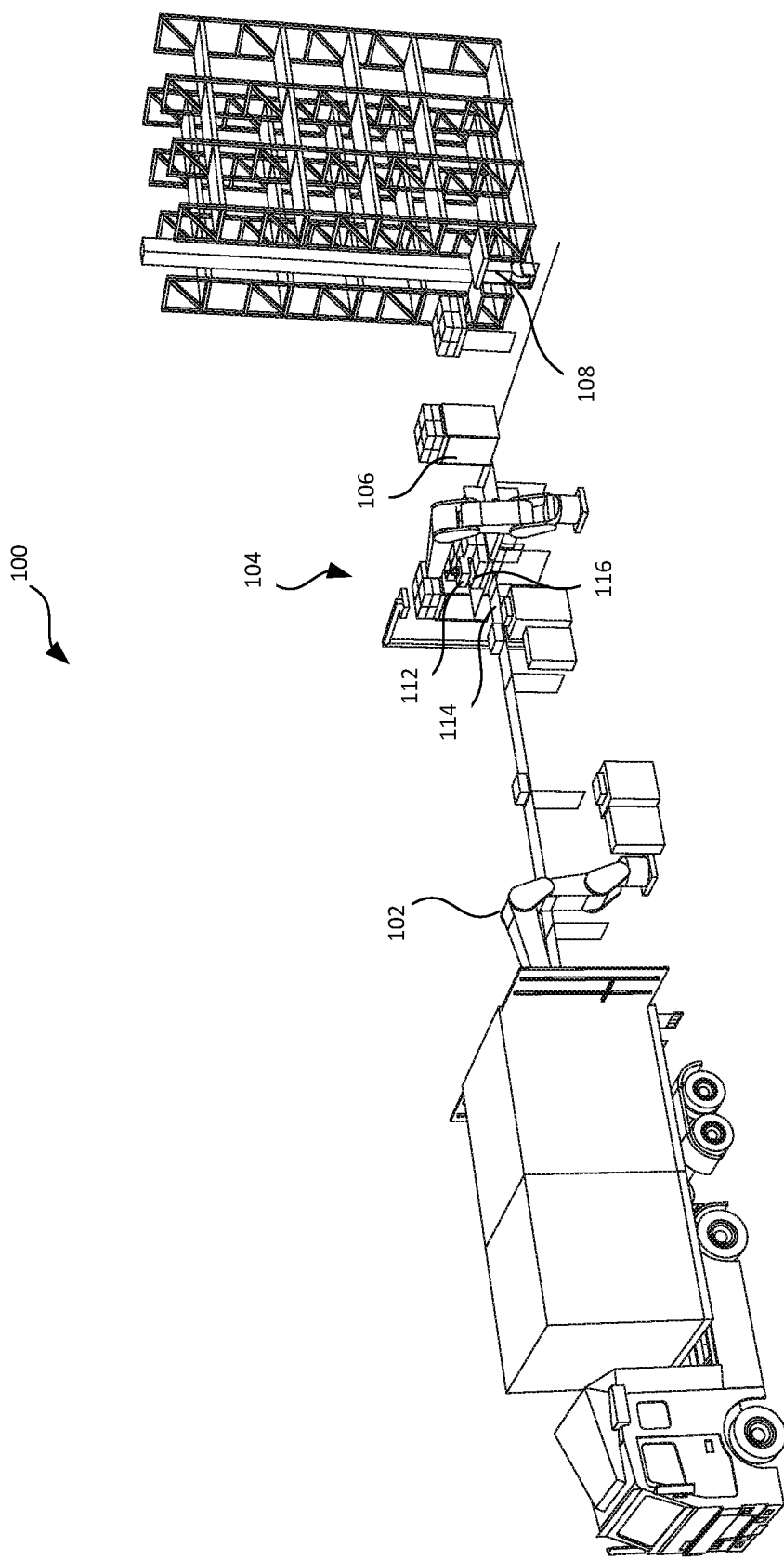
FIG. 1 is an illustration of an example environment in which a robotic system with a package registration mechanism may operate.

Systems and methods for robotic systems with automated package registration mechanisms are described herein. A robotic system (e.g., an integrated system of devices that executes one or more designated tasks) configured in accordance with some embodiments provides enhanced usability and flexibility by autonomously/automatically (e.g., with little or no human-operator inputs) registering previously unknown or unrecognized objects (e.g., packages, boxes, cases, etc.). To determine whether objects are recognized, the robotic system can obtain and compare data regarding objects at a start location (e.g., one or more images of exposed surfaces of the objects) to registration data for known or expected objects. The robotic system can determine an object as being recognized when the compared data (e.g., a portion of the compared image) matches registration data (e.g., one of the registered surface images) for one of the objects. The robotic system can determine an object as being unrecognized when the compared data fails to match the registration data of known or expected objects.

In some embodiments, the robotic system can identify and register the unrecognized objects within a set of objects (e.g., a target stack). The robotic system can identify the unrecognized objects based on comparing sensor outputs (e.g., images and/or depth maps) to master data that includes predetermined information regarding physical traits of one or more known/expected objects. For example, the robotic system can compare the sensor outputs or portions thereof to images of the known/expected objects to recognize the objects in the sensor output. The robotic system can determine that unmatched portions of the sensor output corresponds to one or more unrecognized objects.

As described in detail below, in some embodiments, the robotic system can manipulate the unrecognized objects according to one or more estimations and determine additional information (e.g., a surface image and/or physical dimensions) about the unrecognized objects. For example, the robotic system can identify exposed edges and/or exposed outer corners of the unrecognized objects that are separate or non-adjacent to other objects. In one or more embodiments, the robotic system can identify the exposed edges and/or the exposed outer corners for the unrecognized objects that are located at corners on the target stack and/or protrude relative to other objects located on a common layer (e.g., objects with exposed surfaces having heights within a threshold range from each other). Based on the exposed edges and/or the exposed outer corners the robotic system can derive minimum viable regions (MVRs) on the exposed surfaces. The MVRs can represent areas required to contact and lift the corresponding objects. The robotic system can grip the unrecognized objects over the MVRs and perform an initial lift, thereby separating (e.g., vertically and/or horizontally) previously unclear edges from adjacent objects.

After the initial lift, the robotic system can obtain and process comparison data (e.g., sensor data representing the unrecognized objects after the initial lift) to identify new information regarding the unrecognized objects. For example, the robotic system can process the comparison data to identify newly discovered (e.g., previously uncertain) edges and/or corners, associated measurements (e.g., dimensions of the objects), updated images/depth maps, or a combination thereof for the unrecognized objects. The robotic system can store the new information in the master data to autonomously/automatically register ("auto-register") the previously unrecognized objects. Accordingly, the robotic system can use the auto-registration data to identify, process, and/or manipulate same type of objects.

In some embodiments, the robotic system can further obtain additional information (e.g., heights, depths, and/or profile or side views) of the unrecognized objects. For example, the robotic system can raise or lower the unrecognized objects across crossing references (e.g., sensed lines/planes corresponding to crossing sensors) that extend along a lateral direction (e.g., a horizontal direction). In one or more embodiments, the crossing references can extend across locations that the transferred objects are required to occupy, such as directly above the starting location and/or directly above the task location. The robotic system can detect sensor events, such as when lowered objects first cross the crossing references and/or when raised objects clear the crossing references. The robotic system can determine vertical positions (e.g., heights) of end-effectors (e.g., grippers) contacting the manipulated objects at the time of the event. Accordingly, the robotic system can determine height of the objects (e.g., object heights) based on comparing the heights of the end-effectors at the time of the event with known vertical positions of the crossing sensors.

In some embodiments, the crossing sensors can include light/laser-based sensors that detect disruptions/discontinuity in sensing signals, such as when physical objects block or overlap the crossing references. In one or more embodiments, the crossing sensors can be located about key locations (e.g., sourcing locations and/or destinations) where the objects are required to at least temporarily occupy. For example, the crossing sensors can be attached above landing portions on conveyors and/or above package containers (e.g., car tracks, bins, etc.).

Accordingly, the robotic system can obtain various data regarding the previously unrecognized objects and use it to autonomously generate corresponding registration data and update the master data. The generated registration data can include surface images, dimensions (including the object height), weight, estimated center-of-mass (CoM) location, and/or other physical characteristics of the corresponding object. Thus, the robotic system can register objects autonomously (e.g., without human operator input) and use the registered data to recognize and process subsequent instances of the same type of object.

Further, using the autonomous registration, the robotic system can process (e.g., transfer, pack, unpack, etc.) the unrecognized objects without operator assistance. Accordingly, the overall operations of the robotic system can continue uninterrupted even when objects are unrecognized objects. Also, the crossing sensors allow for accurate measurement of the object height without interrupting the transfer/object manipulation. Thus, the robotic system can measure the object in 3D without deviating from a task-based motion plan.

In the following description, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer- or processor-executable instructions, including routines executed by a programmable computer or processor. Those skilled in the relevant art will appreciate that the disclosed techniques can be practiced on computer or processor systems other than those shown and described below. The techniques described herein can be embodied in a special-purpose computer or data processor that is specifically programmed, configured, or constructed to execute one or more of the computer-executable instructions described below. Accordingly, the terms "computer" and "processor" as generally used herein refer to any data processor and can include Internet appliances and handheld devices (including palm-top computers, wearable computers, cellular or mobile phones, multi-processor systems, processor-based or programmable consumer electronics, network computers, mini computers, and the like). Information handled by these computers and processors can be presented at any suitable display medium, including a liquid crystal display (LCD). Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both.

Suitable Environments

FIG. 1 is an illustration of an example environment in which a robotic system 100 with a packing mechanism may operate. The robotic system 100 can include and/or communicate with one or more units (e.g., robots) configured to execute one or more tasks. Aspects of the packing mechanism can be practiced or implemented by the various units.

For the example illustrated in FIG. 1, the robotic system 100 can include an unloading unit 102, a transfer unit 104 (e.g., a palletizing robot and/or a piece-picker robot), a transport unit 106, a loading unit 108, or a combination thereof in a warehouse or a distribution/shipping hub. Each of the units in the robotic system 100 can be configured to execute one or more tasks. The tasks can be combined in sequence to perform an operation that achieves a goal, such as to unload objects from a truck or a van and store them in a warehouse or to unload objects from storage locations and prepare them for shipping. For another example, the task can include placing the objects on a target location (e.g., on top of a pallet and/or inside a bin/cage/box/case). As described below, the robotic system can derive plans (e.g., placement locations/orientations, sequence for transferring the objects, and/or corresponding motion plans) for placing and/or stacking the objects. Each of the units can be configured to execute a sequence of actions (e.g., operating one or more components therein) to execute a task.

In some embodiments, the task can include manipulation (e.g., moving and/or reorienting) of a target object 112 (e.g., one of the packages, boxes, cases, cages, pallets, etc. corresponding to the executing task) from a start location 114 to a task location 116. For example, the unloading unit 102 (e.g., a devanning robot) can be configured to transfer the target object 112 from a location in a carrier (e.g., a truck) to a location on a conveyor belt. Also, the transfer unit 104 can be configured to transfer the target object 112 from one location (e.g., the conveyor belt, a pallet, or a bin) to another location (e.g., a pallet, a bin, etc.). For another example, the transfer unit 104 (e.g., a palletizing robot) can be configured to transfer the target object 112 from a source location (e.g., a pallet, a pickup area, and/or a conveyor) to a destination pallet. In completing the operation, the transport unit 106 can transfer the target object 112 from an area associated with the transfer unit 104 to an area associated with the loading unit 108, and the loading unit 108 can transfer the target object 112 (by, e.g., moving the pallet carrying the target object 112) from the transfer unit 104 to a storage location (e.g., a location on the shelves). Details regarding the task and the associated actions are described below.

For illustrative purposes, the robotic system 100 is described in the context of a shipping center; however, it is understood that the robotic system 100 can be configured to execute tasks in other environments/for other purposes, such as for manufacturing, assembly, packaging, healthcare, and/or other types of automation. It is also understood that the robotic system 100 can include other units, such as manipulators, service robots, modular robots, etc., not shown in FIG. 1. For example, in some embodiments, the robotic system 100 can include a depalletizing unit for transferring the objects from cage carts or pallets onto conveyors or other pallets, a container-switching unit for transferring the objects from one container to another, a packaging unit for wrapping the objects, a sorting unit for grouping objects according to one or more characteristics thereof, a piece-picking unit for manipulating (e.g., for sorting, grouping, and/or transferring) the objects differently according to one or more characteristics thereof, or a combination thereof.

Suitable System

Figure 2:
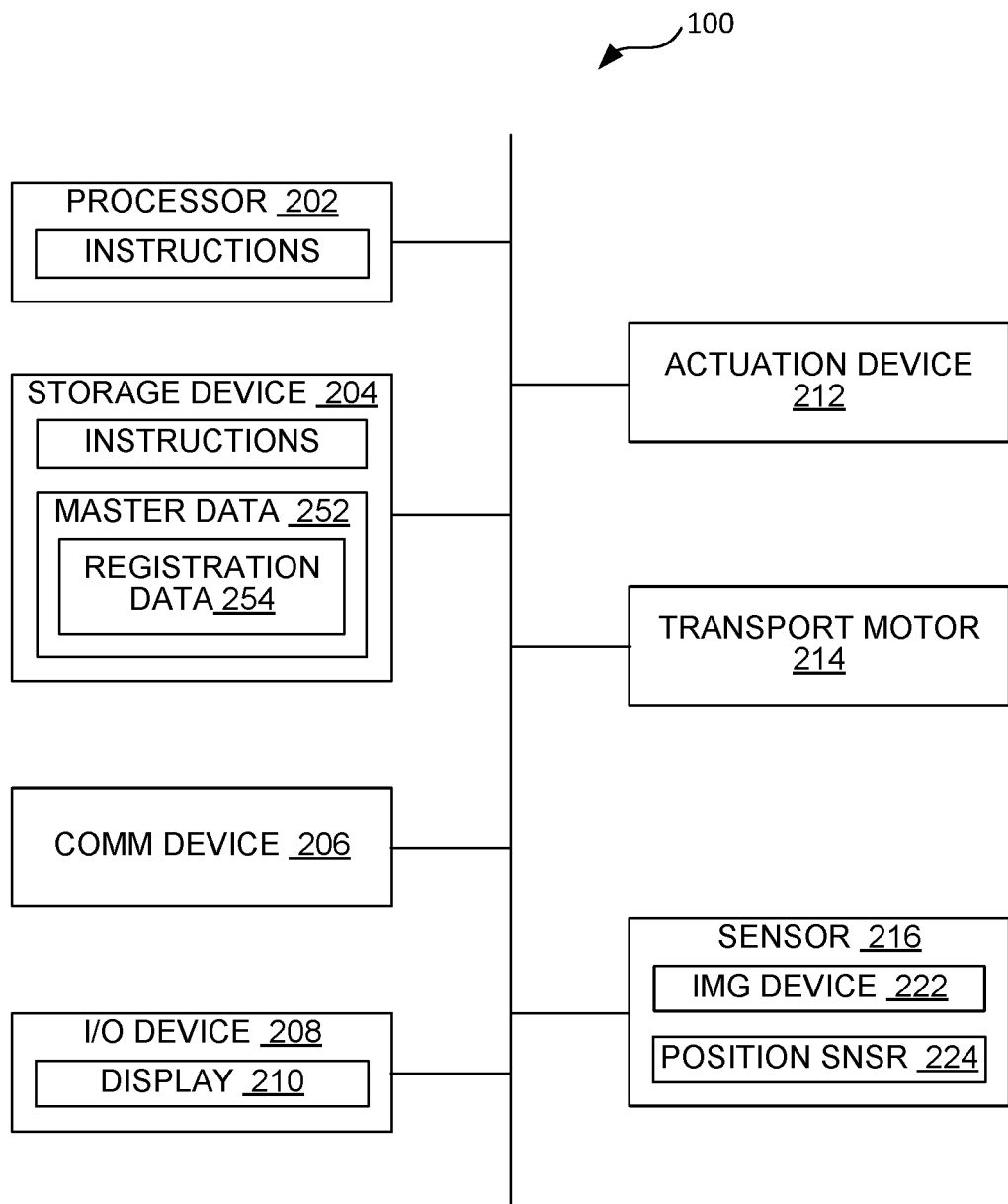
FIG. 2 is a block diagram illustrating the robotic system in accordance with one or more embodiments of the present technology.

FIG. 2 is a block diagram illustrating the robotic system 100 in accordance with one or more embodiments of the present technology. In some embodiments, for example, the robotic system 100 (e.g., at one or more of the units and/or robots described above) can include electronic/electrical devices, such as one or more processors 202, one or more storage devices 204, one or more communication devices 206, one or more input-output devices 208, one or more actuation devices 212, one or more transport motors 214, one or more sensors 216, or a combination thereof. The various devices can be coupled to each other via wire connections and/or wireless connections. For example, the robotic system 100 can include a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"). Also, for example, the robotic system 100 can include bridges, adapters, processors, or other signal-related devices for providing the wire connections between the devices. The wireless connections can be based on, for example, cellular communication protocols (e.g., 3G, 4G, LTE, 5G, etc.), wireless local area network (LAN) protocols (e.g., wireless fidelity (WIFI)), peer-to-peer or device-to-device communication protocols (e.g., Bluetooth, Near-Field communication (NFC), etc.), Internet of Things (IoT) protocols (e.g., NB-IoT, LTE-M, etc.), and/or other wireless communication protocols.

The processors 202 can include data processors (e.g., central processing units (CPUs), special-purpose computers, and/or onboard servers) configured to execute instructions (e.g. software instructions) stored on the storage devices 204 (e.g., computer memory). In some embodiments, the processors 202 can be included in a separate/stand-alone controller that is operably coupled to the other electronic/ electrical devices illustrated in FIG. 2 and/or the robotic units illustrated in FIG. 1. The processors 202 can implement the program instructions to control/interface with other devices, thereby causing the robotic system 100 to execute actions, tasks, and/or operations.

The storage devices 204 can include non-transitory computer-readable mediums having stored thereon program instructions (e.g., software). Some examples of the storage devices 204 can include volatile memory (e.g., cache and/or random-access memory (RAM)) and/or non-volatile memory (e.g., flash memory and/or magnetic disk drives). Other examples of the storage devices 204 can include portable memory drives and/or cloud storage devices.

In some embodiments, the storage devices 204 can be used to further store and provide access to processing results and/or predetermined data/thresholds. For example, the storage devices 204 can store master data 252 that includes descriptions of objects (e.g., boxes, cases, and/or products) that may be manipulated by the robotic system 100. In one or more embodiments, the master data 252 can include registration data 254 for each such object. The registration data 254 can include a dimension, a shape (e.g., templates for potential poses and/or computer-generated models for recognizing the object in different poses), a color scheme, an image, identification information (e.g., bar codes, quick response (QR) codes, logos, etc., and/or expected locations thereof), an expected weight, other physical/visual characteristics, or a combination thereof for the objects expected to be manipulated by the robotic system 100. In some embodiments, the master data 252 can include manipulation-related information regarding the objects, such as a center-of-mass (CoM) location or an estimate thereof on each of the objects, expected sensor measurements (e.g., for force, torque, pressure, and/or contact measurements) corresponding to one or more actions/maneuvers, or a combination thereof.

The communication devices 206 can include circuits configured to communicate with external or remote devices via a network. For example, the communication devices 206 can include receivers, transmitters, modulators/demodulators (modems), signal detectors, signal encoders/decoders, connector ports, network cards, etc. The communication devices 206 can be configured to send, receive, and/or process electrical signals according to one or more communication protocols (e.g., the Internet Protocol (IP), wireless communication protocols, etc.). In some embodiments, the robotic system 100 can use the communication devices 206 to exchange information between units of the robotic system 100 and/or exchange information (e.g., for reporting, data gathering, analyzing, and/or troubleshooting purposes) with systems or devices external to the robotic system 100.

The input-output devices 208 can include user interface devices configured to communicate information to and/or receive information from human operators. For example, the input-output devices 208 can include a display 210 and/or other output devices (e.g., a speaker, a haptics circuit, or a tactile feedback device, etc.) for communicating information to the human operator. Also, the input-output devices 208 can include control or receiving devices, such as a keyboard, a mouse, a touchscreen, a microphone, a user interface (UI) sensor (e.g., a camera for receiving motion commands), a wearable input device, etc. In some embodiments, the robotic system 100 can use the input-output devices 208 to interact with the human operators in executing an action, a task, an operation, or a combination thereof.

The robotic system 100 can include physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices 212 (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include the transport motors 214 configured to transport the corresponding units/chassis from place to place.

The robotic system 100 can include the sensors 216 configured to obtain information used to implement the tasks, such as for manipulating the structural members and/or for transporting the robotic units. The sensors 216 can include devices configured to detect or measure one or more physical properties of the robotic system 100 (e.g., a state, a condition, and/or a location of one or more structural members/joints thereof) and/or of a surrounding environment. Some examples of the sensors 216 can include accelerometers, gyroscopes, force sensors, strain gauges, tactile sensors, torque sensors, position encoders, etc.

In some embodiments, for example, the sensors 216 can include one or more imaging devices 222 (e.g., visual and/or infrared cameras, 2D and/or 3D imaging cameras, distance measuring devices such as lidars or radars, etc.) configured to detect the surrounding environment. The imaging devices 222 can generate representations of the detected environment, such as digital images and/or point clouds, that may be processed via machine/computer vision (e.g., for automatic inspection, robot guidance, or other robotic applications). As described in further detail below, the robotic system 100 (via, e.g., the processors 202) can process the digital image and/or the point cloud to identify the target object 112 of FIG. 1, the start location 114 of FIG. 1, the task location 116 of FIG. 1, a pose of the target object 112, a confidence measure regarding the start location 114 and/or the pose, or a combination thereof.

For manipulating the target object 112, the robotic system 100 (via, e.g., the various circuits/devices described above) can capture and analyze an image of a designated area (e.g., a pickup location, such as inside the truck or on the conveyor belt) to identify the target object 112 and the start location 114 thereof. Similarly, the robotic system 100 can capture and analyze an image of another designated area (e.g., a drop location for placing objects on the conveyor, a location for placing objects inside the container, or a location on the pallet for stacking purposes) to identify the task location 116. For example, the imaging devices 222 can include one or more cameras configured to generate images of the pickup area and/or one or more cameras configured to generate images of the task area (e.g., drop area). Based on the captured images, as described below, the robotic system 100 can determine the start location 114, the task location 116, the associated poses, a packing/placement plan, a transfer/packing sequence, and/or other processing results. Details regarding the packing algorithm are described below.

In some embodiments, for example, the sensors 216 can include position sensors 224 (e.g., position encoders, potentiometers, etc.) configured to detect positions of structural members (e.g., the robotic arms and/or the end-effectors) and/or corresponding joints of the robotic system 100. The robotic system 100 can use the position sensors 224 to track locations and/or orientations of the structural members and/or the joints during execution of the task.

Object Transfer and Registration with a Destination-Based Sensor

Figure 3:
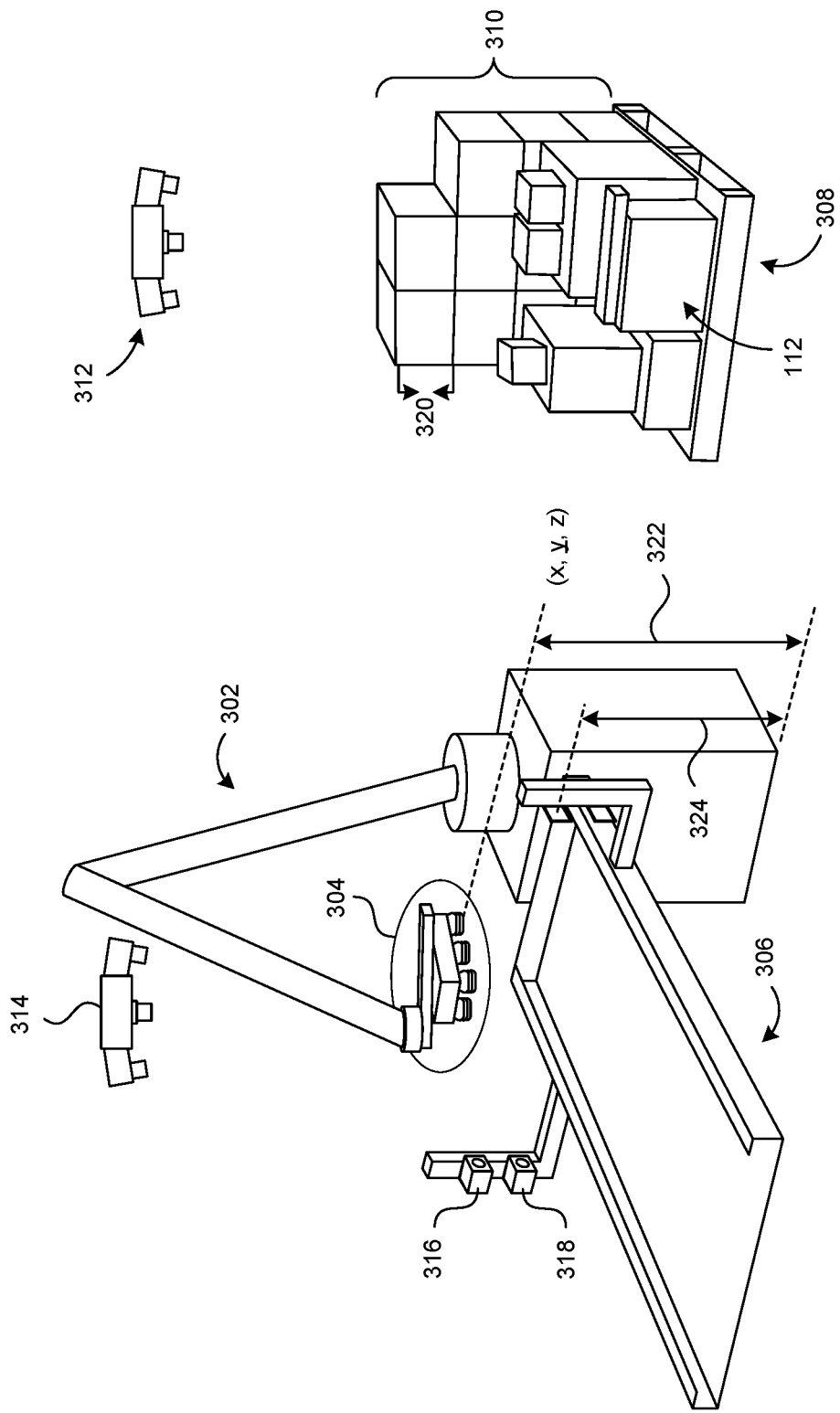
FIG. 3 is an illustration of the robotic system in accordance with one or more embodiments of the present technology.

FIG. 3 is an illustration of the robotic system 100 of FIG. 1 in accordance with one or more embodiments of the present technology. The robotic system 100 can include a robotic arm 302 (e.g., an instance of the transfer unit 104 of FIG. 1) that includes an end-effector 304 (e.g., a gripper). The robotic arm 302 can be configured to transfer the target object 112 between the start location 114 of FIG. 1 and the task location 116 of FIG. 1. As illustrated in FIG. 3, the start location 114 can have a pallet 308 with a target stack 310 (e.g., a grouping of objects) thereon. The task location 116 for the robotic arm 302 can be a placement location (e.g., a starting/egress point) on a conveyor 306 (e.g., an instance of the transport unit 106 of FIG. 1). For example, the robotic arm 302 can be configured to pick the objects from the target stack 310 and place them on the conveyor 306 for transport to another destination/task.

The robotic system 100 can use one or more of the sensors 216 of FIG. 2 in performing the transfer operation with the robotic arm 302. In some embodiments, the robotic system 100 can include a first imaging sensor 312 and/or a second imaging sensor 314. The first imaging sensor 312 can include one or more 2D and/or 3D sensors, such as cameras and/or depth sensors, configured to image and/or analyze the start location 114. The second imaging sensor 314 can include one or more 2D and/or 3D sensors, such as cameras and/or depth sensors, configured to image and/or analyze the task location 116. For example, the first imaging sensor 312 can include one or more cameras and/or depth sensors located at a known location above and facing the start location 114. The first imaging sensor 312 can generate imaging data corresponding to one or more top views of the start location 114, such as a top view of the target stack 310. Also, the second imaging sensor 314 can include one or more cameras and/or depth sensors located at one or more known locations above/lateral to and facing the task location 116 or an associated space. Accordingly, the second imaging sensor 314 can generate imaging data corresponding to one or more top and/or side views of the target object 112 at or within a threshold distance from the task location 116.

In some embodiments, the robotic system 100 can include one or more crossing sensors (e.g., a first crossing sensor 316 and/or a second crossing sensor 318) configured to detect crossing events where an object crosses/leaves corresponding sensing line/plane. For example, the crossing sensors can correspond to line or plane sensors that detect crossing events based on continuity/disruption in transmitted and/or reflected signals (e.g., optical signals, laser, etc.). The crossing sensors, in some embodiments, can transmit optical signals along a sensing line and detect and/or reflect the transmitted signals at an end of the sensing line. Accordingly, the crossing sensors can detect disruptions (e.g., discontinuity) in receiving the transmitted optical signals, which can correspond to an entry event representing an object crossing/entering the sensing line. Similarly, the crossing sensors can re-detect the transmitted signals following a period of disruption, which can correspond to an exit event that represents the object exiting the sensing line. The crossing sensors can generate and/or communicate event data (e.g., flags, state determinations, crossing directions, and/or time stamps) based on detecting the disruptions, redetection of optical signals, and/or a sequence thereof.

In some embodiments, the second crossing sensor 318 can be used to release the gripped object. The second crossing sensor 318 can be located above the task location 116 and/or establish the sensing line at a predetermined height. The height of the sensing line/plane (e.g., a release height) can be for safely dropping objects without damaging the objects. As an example, the height for the sensing line can be 10 cm or less above the placement location on the conveyor 306. Accordingly, the robotic system 100 can use the crossing event detected by the second crossing sensor 318 as a trigger to release the carried object from of the end-effector 304. In some embodiments, the release height can overlap or be coincident with a sensing line/plane of the first crossing sensor 316. In other embodiments, the release height can be between vertical locations of the sensing line/plane of the first crossing sensor 316 and a placement surface of the task location 116 (e.g., the placement surface on the conveyor 306). In other words, the sensing line/plane for the first crossing sensor 316 can be located above the release height corresponding to the second crossing sensor 318.

In some embodiments, the first crossing sensor 316 can be used to measure a height of the target object 112 during transfer. For example, the robotic system 100 can determine a gripper height 322 (e.g., a vertical position/location/coordinate of the end-effector 304 relative to a reference point, such as the ground) at the time of an entry event as detected by the first crossing sensor 316. The robotic system 100 can compare the gripper height 322 to a crossing reference height 324 (e.g., a known vertical position of the first crossing sensor 316 and/or a reference line/plane thereof) to calculate the object height of the target object 112 that is being transferred. In other words, the first crossing sensor 316 can act as a trigger that indicates a time when a bottom portion of the target object 112 crosses the sensing line. Accordingly, the robotic system 100 can use the gripper height 322 at such time and the known height of the sensing line to calculate the object height for the target object 112. In some embodiments, the first crossing sensor 316 can trigger one or more instances of the second imaging sensor 314 (e.g., horizontally facing cameras directed at the task location 116) to collect data when the bottom portion of the target object 112 crosses the sensing line. Accordingly, the robotic system 100 can obtain data regarding the object from different points of view (e.g., side or profile views/images, shape measurements along a different dimension, etc.).

For illustrative purposes, the first crossing sensor 316 is shown attached to the conveyor 306. However, it is understood that the first crossing sensor 316 can be configured differently. For example, the first crossing sensor 316 can be disconnected and/or independent from any apparatus at the task location 116. The first crossing sensor 316 can be configured to detect crossing events relative to a line/plane above (e.g., at the crossing reference height 324) and/or overlapping the task location 116. In some embodiments, the first crossing sensor 316 can be configured to detect crossing events relative to a line/plane that extends laterally/horizontally and is above a placement surface/location by a relatively short distance (e.g., less than one meter, such as 10 centimeters). In one or more embodiments, functions of the first crossing sensor 316 and the second crossing sensor 318 can be combined such that the robotic system 100 determines the object height and releases the object based on one crossing event.

The first crossing sensor 316 and/or the second imaging sensor 314 (e.g., horizontally facing cameras) provide additional data of objects (e.g., unrecognized objects) during transfer. As described above, the first crossing sensor 316 can be used to calculate an object height of the transferred object without any additional maneuvers/movements in transferring the object. Further, determining the object height after lifting the object provides increased accuracy in the height measurements since some objects may deform when they are resting on top of another object. In other words, shapes and any corresponding dimensions of the objects may change when the objects are lifted/suspended. For example, when suspended, the object profiles and/or the corresponding heights (e.g., distances from the end-effector 304 to bottom portions of the objects) may change due to a lack of rigidity in the package, such as for cloth-based or rubber-based items that are wrapped in plastic wrappings. By using a crossing sensor (e.g., the first crossing sensor 316) to determine the object height during transfer, the robotic system 100 can accurately account (via, e.g., motion planning) for any changes in shapes/dimensions of the objects during transfer. Thus, the robotic system 100 can use the actual object height (e.g., height of the object when suspended instead of the resting height) in transferring the objects, thereby reducing/eliminating any collisions that may have occurred due to the changes in the shapes. In some embodiments, the robotic system 100 can adjust transport speed, transport acceleration, or a combination thereof according to the actual object height, such as to reduce swaying or pendulating motion of the transferred object. In some embodiments, the robotic system 100 can use the resting object height and/or the transfer object height to register the unrecognized objects.

Further, the first crossing sensors 316 can trigger further sensors to obtain additional information (e.g., 2D/3D images of one or more vertical surfaces/edges and/or profile shapes) about the object that may not be detectable by the first imaging sensor 312 and/or the second imaging sensor 314. As described in detail below, the object height and/or the additional information can be used to generate the registration data 254 of FIG. 2 for unrecognized objects. Accordingly, the robotic system 100 can obtain more information about unrecognized objects, which can be used to increase likelihood of subsequent recognitions of other like objects and/or to increase accuracy in further manipulating the object, without disturbing the transfer task.

In some embodiments, the robotic system 100 can use the object height and/or the additional information to re-analyze and recognize the object, such as by analyzing other surfaces (e.g., vertical surfaces/dimensions) of the object in addition to the top surface. Accordingly, the robotic system 100 can reduce the number of unrecognized boxes or false negative results.

Object Recognition

Figure 4A:
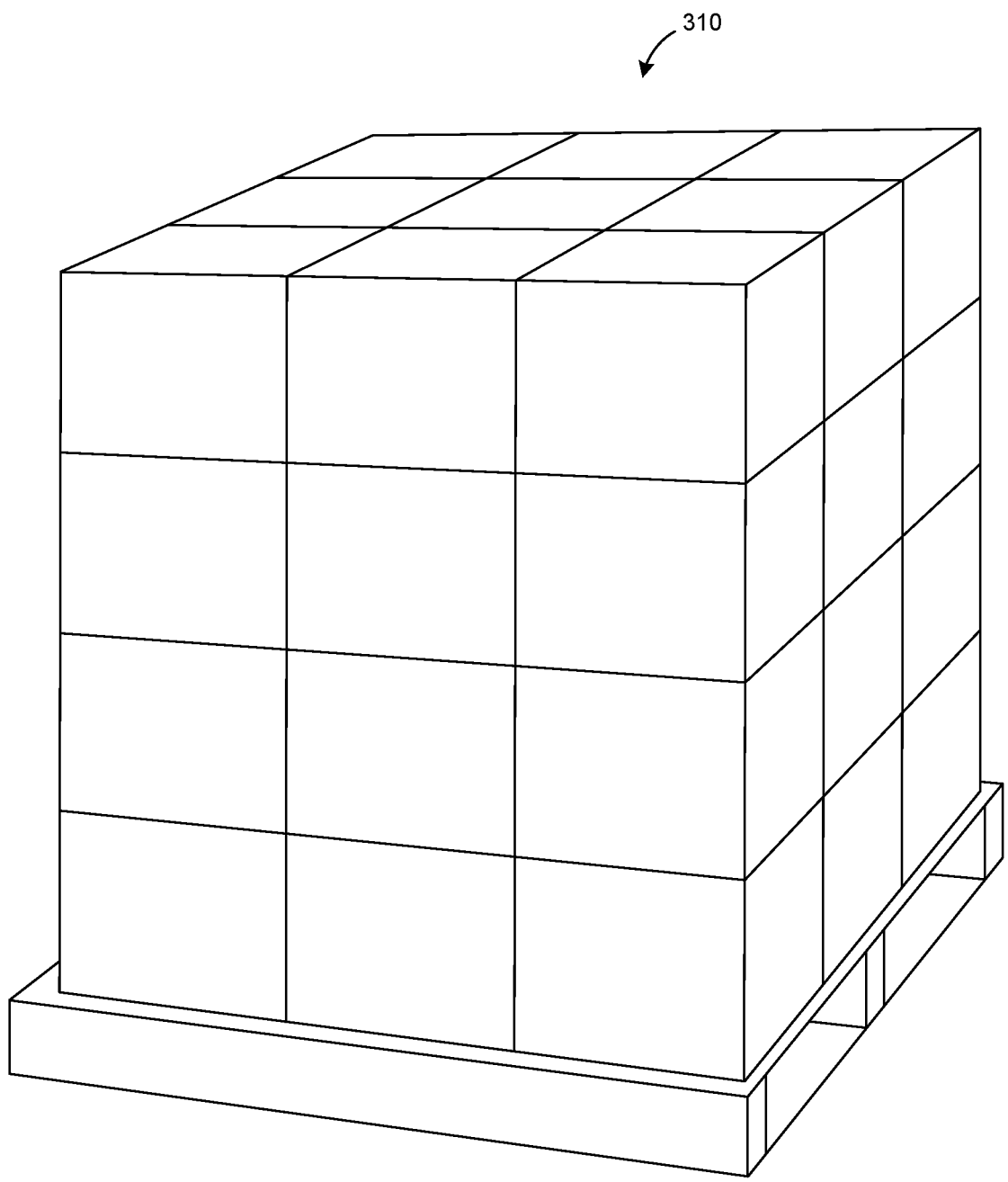
FIG. 4A is an illustration of an example stack of objects processed by the robotic system in accordance with one or more embodiments of the present technology.
Figure 4B:
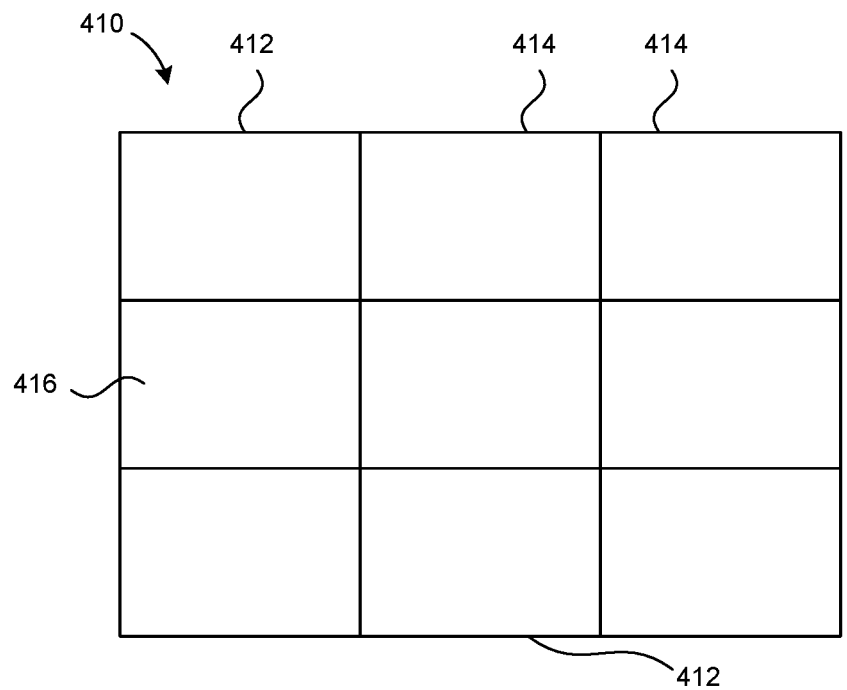
FIG. 4B is an illustration of a top surface of the example stack in accordance with one or more embodiments of the present technology.
Figure 4C:
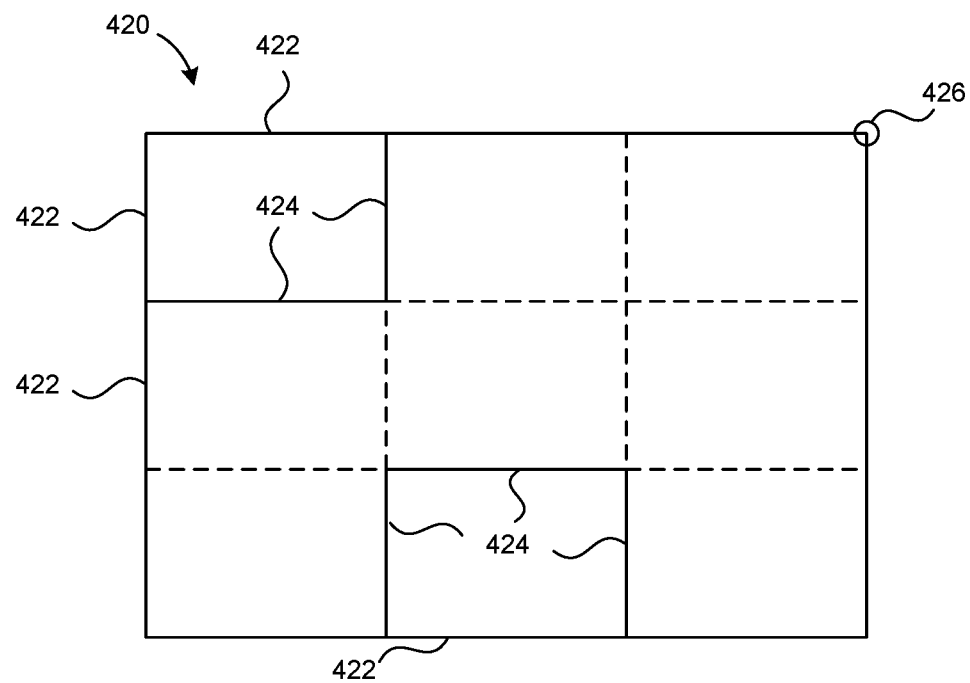
FIG. 4C is an illustration of sensor data corresponding to the top surface in accordance with one or more embodiments of the present technology.

FIG. 4A is an illustration of an example stack of objects (e.g., the target stack 310 of FIG. 3) processed by the robotic system 100 of FIG. 1; FIG. 4B is an illustration of a top surface of the example stack (e.g., an actual top view 410 of the target stack 310); and FIG. 4C is an illustration of sensor data (e.g., top view data 420) corresponding to the top surface, all in accordance with one or more embodiments of the present technology. Referring to FIGS. 4A, 4B, and 4C together, the robotic system 100 can be configured to transfer the objects within the target stack 310 to another location, such as the task location 116 of FIG. 1 (e.g., the conveyor 306 of FIG. 3), as described above. For transferring the objects, the robotic system 100 can use image data (e.g., the top view data 420) from the first imaging sensor 312 of FIG. 3 that is located above the target stack 310. For example, the top view data 420 can include one or more visual images and/or one or more depth maps that depict or represent the actual top view 410. Further, the robotic system 100 can analyze the top view data 420 to identify edges that may correspond to object boundaries. For example, the robotic system 100 can identify edges and/or continuous surfaces represented in the image data based on differences in depth measurements and/or image traits (e.g., different colors, linear patterns, shadows, differences in clarity, etc.). Also, the robotic system 100 can identify exposed edges 422 (e.g., edges of object top surfaces that are not horizontally abutting another object/surface at substantially the same height), such as based on differences in the depth measurements.

The target stack 310 may include objects registered in the master data 252 of FIG. 2 and/or unexpected objects not registered in the master data 252. As such, the robotic system 100 can use the image data of object surfaces 416 to recognize or identify the objects that are within the target stack 310. In some embodiments, the robotic system 100 can compare the image data or one or more portions therein to the master data 252 (e.g., the various registration data 254 of FIG. 2 therein corresponding to the object surfaces 416) to recognize the objects within the target stack 310. For example, the robotic system 100 can identify the known objects (e.g., recognized objects 412) within the target stack 310 when a portion of the top view data 420 matches one or more images of the object surfaces 416 in the registration data 254. The remaining portions of the actual top view 410 (e.g., portions not matching the registration data 254) can correspond to unrecognized objects 414. The edges of the unrecognized objects 414 are shown using dashed lines in FIG. 4C.

Based on matching the image data, the robotic system 100 can locate the recognized objects 412 within the corresponding image data, which can be further translated (via, e.g., pre-calibrated table and/or equations that map pixel locations to a coordinate system) to real-world locations for the target stack 310. Further, the robotic system 100 can estimate locations of non-exposed edges of the recognized objects 412 based on the match. For example, the robotic system 100 can obtain dimensions of the recognized objects 412 from the master data 252. The robotic system 100 can measure portions of the image data that is separated by the known dimensions from the exposed edges 422 of the recognized objects 412. According to the mapping, the robotic system 100 can determine one or more registration-based edges 424 for the recognized objects 412 and/or similarly map the registration-based edges 424 to real-world locations similarly as described above.

In some embodiments, the robotic system 100 can identify exposed outer corners 426 of the target stack 310 as represented in the image data. For example, the robotic system 100 can identify the exposed outer corners 426 based on detecting intersections/junctions between two or more of the exposed edges 422 having different orientations (e.g., extending at different angles). In one or more embodiments, the robotic system 100 can identify the exposed outer corners 426 when the exposed edges 422 form an angle that is within a predetermined range, such as for a threshold range about 90°. As described in detail below, the robotic system 100 can use the exposed outer corners 426 and the corresponding exposed edges 422 to process and/or manipulate the unrecognized objects 414.

Processing of Unrecognized Objects

Figure 5A:
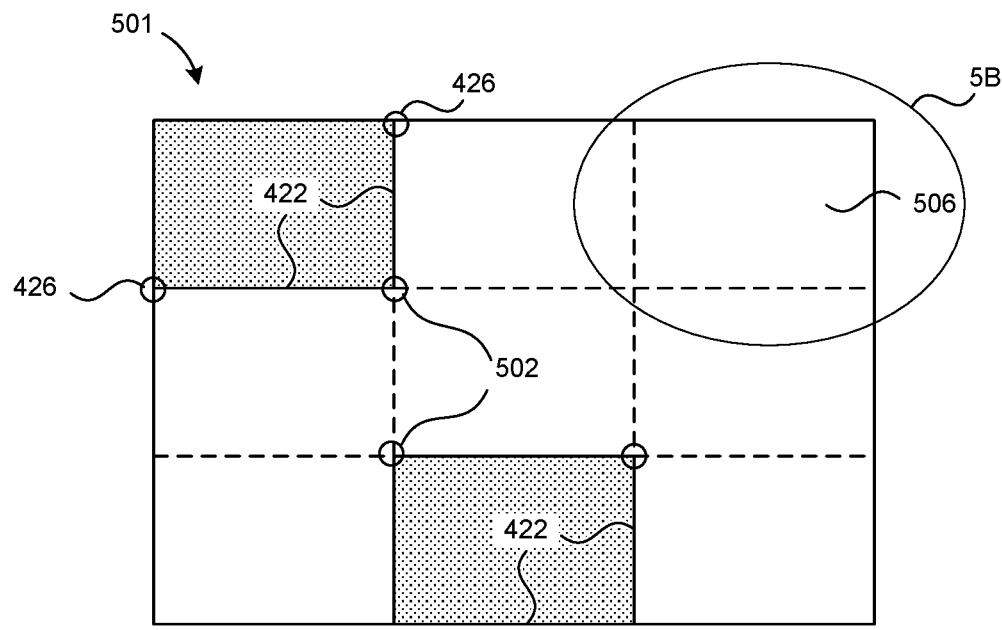
FIG. 5A is an illustration of sensor data corresponding to a top surface following an initial set of operations in accordance with one or more embodiments of the present technology.

In some embodiments, the robotic system 100 can process (e.g., identify and/or transfer) the objects according to recognition status and/or relative locations of the objects within the target stack 310. For example, the robotic system 100 can pick and transfer the recognized objects first, and then generate another set of image data from the sensors (e.g., the first imaging sensor 312 of FIG. 3). FIG. 5A is an illustration of sensor data 501 corresponding to a top surface following an initial set of operations (e.g., picking and transferring the recognized objects 412) in accordance with one or more embodiments of the present technology. The shaded areas in FIG. 5A correspond to changes in depth measurements following the removal of the recognized objects 412 shown in FIGS. 4B and 4C.

When the robotic system 100 does not identify any recognized objects 412 in the image data, the robotic system 100 can identify any exposed corners and/or the exposed edges 422 for locating the unrecognized objects 414 of FIG. 4A. For example, the robotic system 100 can process the sensor data 501 similarly as described above to identify the exposed outer corners 426 and/or the exposed edges 422. Accordingly, the robotic system 100 can additionally identify and/or locate any corners/edges that are exposed after removing the recognized objects 412. In some embodiments, the robotic system 100 can further identify exposed inner corners 502 as intersections/junctions between two or more of the exposed edges 422 of FIG. 4B according to a corresponding threshold. For example, the robotic system 100 can identify the exposed inner corners 502 as junctions between two or more of the exposed edges 422 that exceed 180° relative to the corresponding continuous surfaces. In some embodiments, the robotic system 100 can identify the exposed inner corners 502 when the exposed edges 422 form an angle that is within a threshold range of about 270°.

In some embodiments, when none of the recognized objects 412 are remaining, the robotic system 100 can identify registration targets 506 in the target stack 310 (e.g., from amongst the unrecognized objects 414) based on the exposed corners and/or exposed edges. For example, the robotic system 100 can select the region of the sensor data 501 and the corresponding unrecognized object 414 associated with the exposed outer corners 426. In other words, after processing the recognized objects 412, the robotic system 100 can process the unrecognized objects 414 that form/constitute the exposed outer corners 426 of the target stack 310. Based on analyzing the corresponding portions of the sensor data 501, the robotic system 100 can grip the unrecognized objects 414, lift and/or horizontally transfer the gripped object, and/or image the gripped object for registration purposes. Additionally, after imaging the gripped object, the robotic system 100 can transfer the gripped object to a destination (e.g., the conveyor 306 of FIG. 3).

Figure 5B:
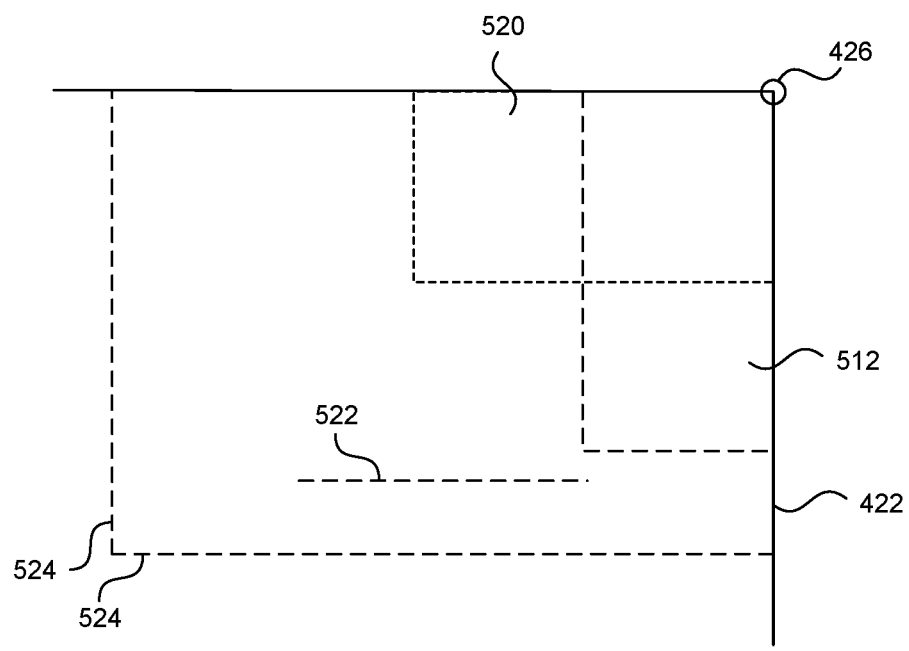
FIG. 5B is an illustration of a portion 5B of the sensor data illustrated in FIG. 5A in accordance with one or more embodiments of the present technology.

For further describing the sensor data analysis, FIG. 5B is a detailed illustration of a portion 5B of the sensor data 501 of FIG. 5A in accordance with one or more embodiments of the present technology. The robotic system 100 can analyze the sensor data 501 according to an MVR 512 to determine a grip location 520. The MVR 512 can represent a minimum-sized area required to contact, grip, and/or lift objects. Accordingly, in some embodiments, the MVR 512 can be based on the end-effector 304 of FIG. 3. For example, the MVR 512 can be associated with a footprint of the end-effector 304, such as an area occupied by the end-effector 304 (e.g., the suction cups of the gripper), or a larger area with additional/buffer regions surrounding the footprint. In some embodiments, the MVR 512 can correspond to a minimum candidate size, which can correspond to physical dimensions (e.g., lengths, widths, heights, diameters, circumferences, etc.) for the smallest possible instance of the objects in the target stack 310. In other words, none of the objects within the target stack 310 will have dimensions that are less than the minimum candidate size. The minimum candidate size can be a predetermined value (i.e. a value provided in advance of processing the target stack 310).

In some embodiments, the robotic system 100 can derive the MVR 512 based on extending two or more intersecting lines from the exposed edges 422 over the corresponding surface (e.g., an area with height/depth values that are within a threshold range from each other). For example, the robotic system 100 can derive the MVR 512 based on extending perpendicular lines from the exposed edges 422 about the exposed outer corner 426. The lines can be extended from a portion (e.g., a point) on the exposed edges 422 that corresponds to a separation distance from the exposed outer corner 426. The separation distance can be a predetermined value and/or a value that is calculated according to one or more processing results (e.g., estimated edges 524 or corresponding confidence values and/or estimated identity of the corresponding object or corresponding confidence values). Accordingly, the robotic system 100 can derive the MVR 512 as the area defined by the extended lines and the exposed edges 422.

In some embodiments, the robotic system 100 can derive a set of potential grip locations using the MVR 512. For example, the robotic system 100 can derive a first grip location with a dimension of the MVR 512 aligned to a first exposed edge and a second grip location with the dimension aligned to a second exposed edge. In some embodiments, the robotic system 100 can derive more than one grip location with the MVR 512 aligned to one of the exposed edges.

The robotic system 100 can use the MVR 512 to determine a grip location 520. The grip location 520 can correspond to an area on the object/stack that will be directly under and/or contact the end-effector 304 for the initial manipulation. In other words, the robotic system 100 can place the gripper over the grip location 520 to grip the corresponding object for subsequent manipulations (e.g., lift, horizontal transfer, and/or data collection processes for registration). In some embodiments the robotic system 100 can select the grip location 520 from the set of potential grip locations. For example, the robotic system 100 can select from the set according to a relative orientation of the arm (e.g., with preference for the robotic arm extending across the exposed edges 422 and not overlapping other portions).

In some embodiments, the robotic system 100 can derive the grip location 520 based on detected lines 522 and/or the estimated edges 524. For example, the robotic system 100 can identify the detected lines 522 and/or the estimated edges 524 based on differences in depth measurements and/or image traits in the sensor data 501. The robotic system 100 can identify results that do not intersect the exposed edge 422 as the detected lines 522, which may correspond to lines within surface markings of the object or object edges. The robotic system 100 can identify results that intersect with at least one exposed edge 422 as the estimated edges 524. Accordingly, the robotic system 100 can derive the grip location 520 that does not overlap the detected lines 522 and/or the estimated edges 524. The robotic system 100 can derive the grip location 520 based on balancing a ratio between distances between edges of the MVR 512 and the nearest detected lines 522 and/or the estimated edges 524. Since the robotic system 100 will be gripping the object at or about a corner based on the MVR 512, the robotic system 100 can derive the grip location 520 that will reduce maximum potential torque along any one particular direction based on balancing the ratio.

The robotic system 100 can use the derived grip location 520 to maneuver the robotic arm 302 of FIG. 3 and the end-effector 304. The robotic system 100 can grip the object (e.g., the registration target 506) located at the corner of the stack at the grip location 520. In some embodiments, the robotic system 100 can lift and/or horizontally transfer the gripped object for clearly distinguishing the previously non-exposed edges. For example, the robotic system 100 can lift and/or horizontally transfer the object by a predetermined height that corresponds to a minimum distance for accurately distinguishing edges. Also, for example, the robotic system 100 can lift and/or horizontally transfer the object while monitoring and/or analyzing the height changes and/or a tilt in the end-effector, such that additional edges opposite to the exposed edges 422 become recognizable. The robotic system 100 can obtain and process data during and/or after the initial lift to further describe the unrecognized objects 414.

Gathering Registration Data for Unrecognized Objects

Figure 6:
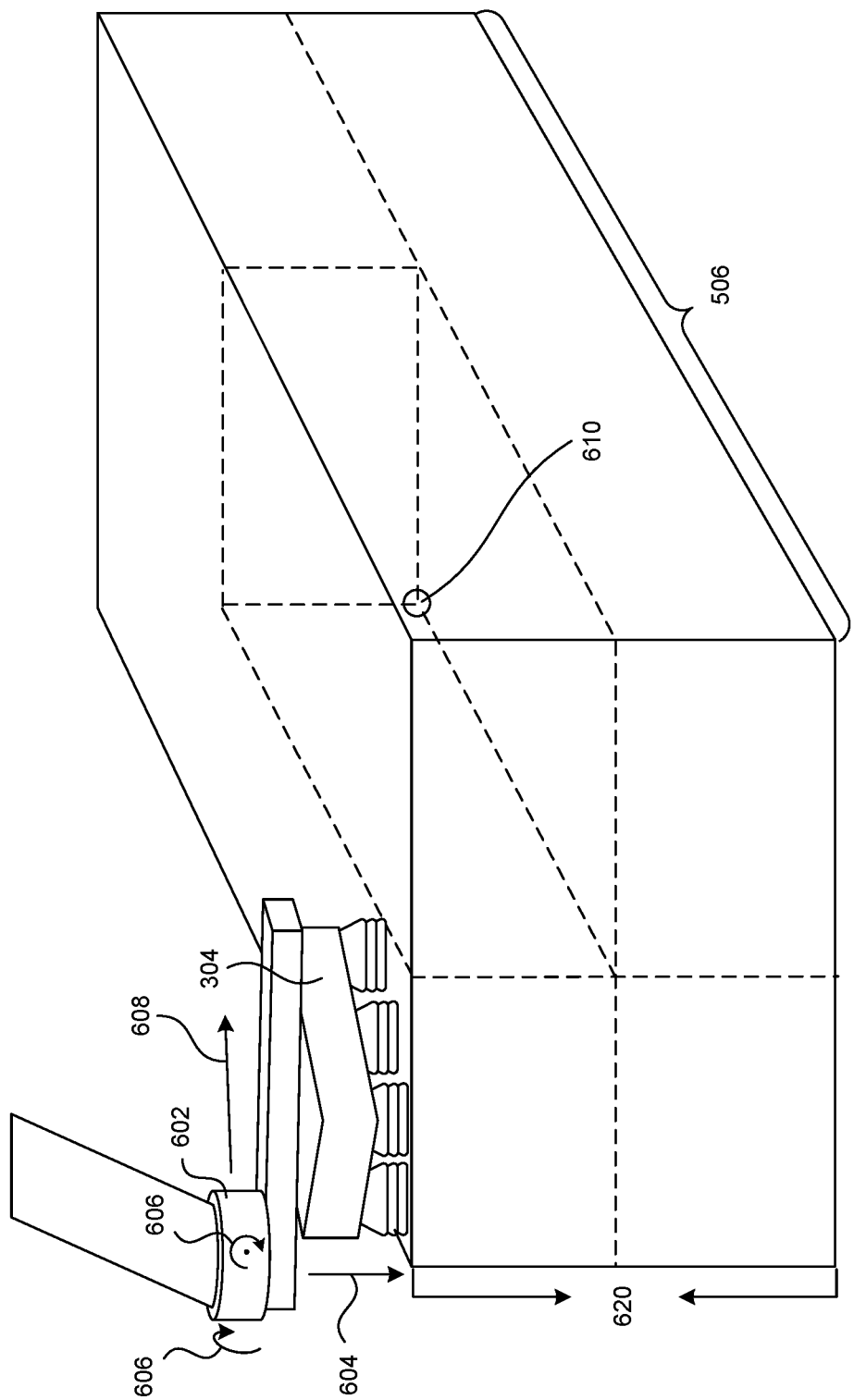
FIG. 6 is an illustration of an object after an initial-lift maneuver in accordance with one or more embodiments of the present technology.

FIG. 6 is an illustration of an object after an initial-lift maneuver in accordance with one or more embodiments of the present technology. As described above and in further detail below, the robotic system 100 can derive a height of an object (e.g., an object height 620 measured along a vertical direction relative to an initial resting pose, a transfer pose, and/or a final placement pose) during transfer operations. The object height 620 can be used for registration purposes and/or for adjusting the transfer operations (e.g., acceleration, speed, and/or motion path).

In some embodiments, the robotic system 100 can include one or more sensors configured to measure a force exerted on the robotic arm 302 of FIG. 3 due to an external object (e.g., the gripped object) and/or a movement thereof. For example, the robotic system 100 can include a force sensor, a torque sensor, or a combination thereof (e.g., a force-torque (FT) sensor 602) attached to and/or integral with the end-effector 304. Accordingly, the robotic system 100 can measure a downward force measurement 604 and/or a torque measurement 606 while lifting the gripped object (e.g., one of the unrecognized objects 414 of FIG. 4 that has been determined as the registration target 506) gripped at the grip location 520 of FIG. 5.

In some embodiments, the robotic system 100 can use the downward force measurement 604 to determine a weight of the registration target 506. In some embodiments, the robotic system 100 can use the downward force measurement 604 and/or the torque measurement 606 to calculate an estimated torque-arm vector 608 and/or an estimated center-of-mass (CoM) 610 for the registration target 506. The estimated torque-arm vector 608 can correspond to a sum of measurement vectors provided by the FT sensor 602. The robotic system 100 can calculate the estimated CoM 610 according to a predetermined process and/or equation that uses the estimated torque-arm vector 608, the torque measurement 606, and/or the downward force measurement 604 as inputs.

In some embodiments, the robotic system 100 can use the sensor measurements as feedback signal for performing the initial-lift maneuver. For example, the robotic system 100 can perform the initial-lift maneuver until the downward force measurement 604 and/or the torque measurement 606 stabilizes (e.g., measurements over a measurement period remain within a threshold range). Accordingly, the robotic system 100 can determine when the gripped object is lifted off (i.e., no longer supported by) an object or a structure underneath and becomes solely supported by the robotic arm 302. The robotic system 100 can use the determined stabilization as a trigger to stop the initial-lift maneuver and/or obtain additional data (e.g., dimensions, weight, CoM, and/or surface images) regarding the gripped object.

Figure 7A:
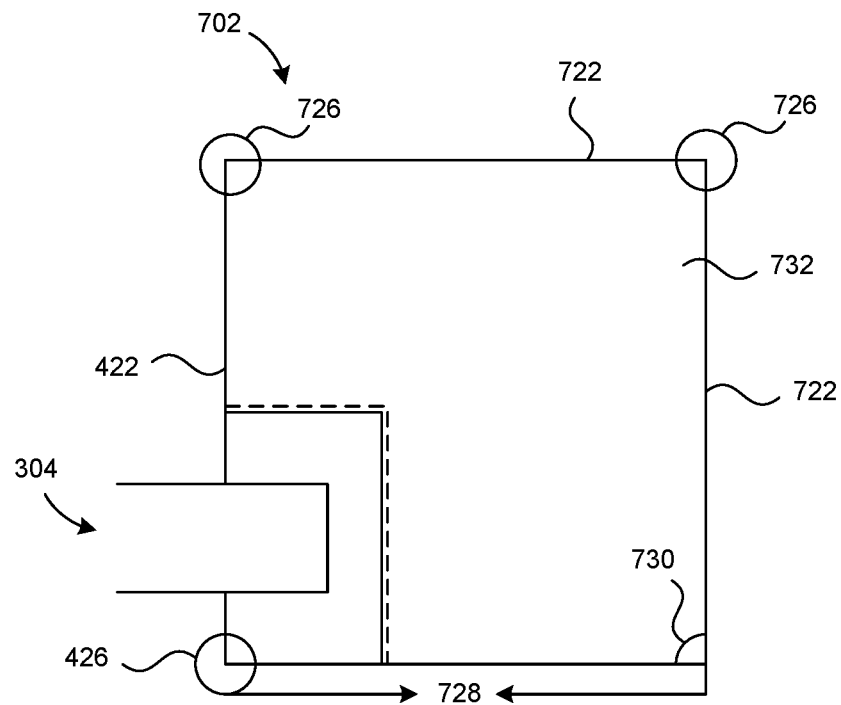
FIG. 7A is an illustration of comparison data in accordance with one or more embodiments of the present technology.
Figure 7B:
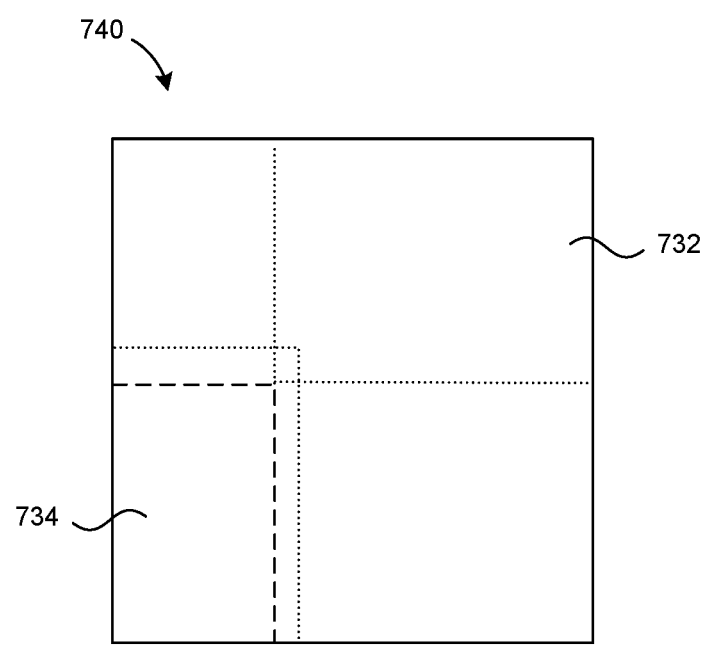
FIG. 7B is an illustration of updated data in accordance with one or more embodiments of the present technology.

To further describe the obtained data regarding the gripped object (e.g., the unrecognized object 414 of FIG. 4B), FIG. 7A is an illustration of comparison data 702, and FIG. 7B is an illustration of updated data 740, both in accordance with one or more embodiments of the present technology. As described above, the robotic system 100 can grip the unrecognized objects 414 based on the MVR 512 of FIG. 5B. Based on the grip, the robotic system 100 can lift (via, e.g., the initial-lift maneuver) and/or horizontally transfer the gripped object, thereby separating the gripped object from adjacent and abutting objects. The robotic system 100 can obtain the comparison data 702 (e.g., 2D/3D measurement data, such as visual images, depth maps, point clouds, etc.) after lifting and/or horizontally transferring the gripped object. In some embodiments, the comparison data 702 can be obtained via one or more of the sensors 216 of FIG. 2, such as the first imaging sensor 312 of FIG. 3.

The robotic system 100 can further generate updated images (e.g., the updated data 740) of the unrecognized objects 414 based on the initial sensor data (e.g., the top view data 420 of FIG. 4C and/or the sensor data 501 of FIG. 5A obtained before lifting the object) and/or the comparison data 702. In some embodiments, the robotic system 100 can generate the updated data 740 based on combining visual or 2D images before and after the initial-lift maneuver. For example, the robotic system 100 can derive a cropped portion 734 from the top view data 420 and/or the sensor data 501 that corresponds to the MVR 512 and/or the grip location 520. The robotic system 100 can derive the cropped portion 734 based on mapping the MVR 512 and/or the grip location 520 to the captured image and copying the pixel information in the corresponding area. The robotic system 100 can generate the updated data 740 based on overlaying the cropped portion 734 over the comparison data 702. The position of the cropped portion 734 relative to the updated data 740 can be determined using the exposed outer corner 426 and the exposed edges 422 as references. Accordingly, the robotic system 100 can use the cropped portion 734 to cover areas within the comparison data 702 that depict the robotic arm 302 of FIG. 3 and/or the end-effector 304 of FIG. 3.

In some embodiments, the robotic system 100 can derive an uncovered portion 732 from the comparison data 702. The uncovered portion 732 can correspond to the top surface of the unrecognized object 414 not covered by the end-effector 304 and/or the robotic arm 302. The robotic system 100 can use one or more predetermined visual/pixel patterns of the end-effector 304 and/or the robotic arm 302 to derive the uncovered portion 732. For example, the robotic system 100 can derive the uncovered portion 732 based on recognizing and removing portions of the comparison data 702 that match the predetermined visual/pixel patterns. The robotic system 100 can combine the uncovered portion 732 with the cropped portion 734 to generate the updated data 740.

The robotic system 100 can process the comparison data 702 and/or the updated data 740 to obtain information regarding one or more physical characteristics of the gripped object. For example, the robotic system 100 can process the comparison data 702 for the outline/shape of the object, including discovered edges 722, discovered corners 726, edge length measurements 728, and/or corner angle measurements 730. The robotic system 100 can use one or more edge detection schemes described above to determine the discovered edges 722 opposite the corresponding exposed edges 422. Elevating the unrecognized objects 414 based on deriving and gripping according to the MVR 512 creates height differences between the top surface of the lifted object and the surrounding objects/surfaces. The height differences can be used to clearly determine the discovered edges 722. The robotic system 100 can determine the discovered edges 722 based on searching for edges that extend from the exposed edges 422. In some embodiments, the robotic system 100 can determine the discovered edges 722 based on determining edges that extend from the exposed edges 422 at about a right angle, such as for rectangular boxes/packages that have a rectangular top surface.

The robotic system 100 can determine the discovered corners 726 as junctions where two or more of the discovered edges 722 with different orientations intersect. In some embodiments, the robotic system 100 can determine angles of the discovered corners 726 (e.g., the corner angle measurements 730), such as according to predetermined functions or equations.

Based on determining the discovered edges 722, the robotic system 100 can calculate the edge length measurements 728 (e.g., the object dimensions) for the discovered edges 722 and/or the exposed edges 422. The robotic system 100 can calculate the edge length measurements 728 based on determining the lengths of edges in the captured image (e.g., the comparison data 702 and/or the sensor data 501) and translating the lengths in the image into real-world length, such as according to one or more predetermined mapping functions/equations.

In some embodiments, the robotic system 100 can determine the edge length measurements 728 based on the comparison data 702 and use the edge length measurements 728 to generate the updated data 740. For example, when cropping a portion of the top view data 420 and/or the sensor data 501, the robotic system 100 can extend beyond one or more boundaries of the MVR 512 and up to the corresponding edge length measurements 728. In lifting some objects according to the exposed edges/corners, the robotic arm 302 may end up occluding portions of the lifted object in the comparison data 702, such as when the exposed corners are located opposite the robot base. Accordingly, the robotic system 100 can determine the occluded region relative to the exposed corner/edges and/or the edge length measurements 728 and crop the corresponding portions from the top view data 420 and/or the sensor data 501. As described above, the robotic system 100 can overlay the cropped portion to replace the occluded region using the exposed corner/edges and/or the edge length measurements 728 as reference. The robotic system 100 can generate the updated data 740 as the combined image with the cropped portion from the initial image (e.g., the first image obtained before lifting) overlaid on or replacing occluded portions in the comparison data 702.

Based on one or more of the processing results described above, the robotic system 100 can generate the registration data 254 for the corresponding object (e.g., the unrecognized objects 414). For example, when the robotic system 100 determines that the target stack 310 or a portion thereof (e.g., the top layer) includes one or more unrecognized objects 414, the robotic system 100 can select one of the unrecognized objects 414 as the registration target 506, manipulate the registration target 506, and/or obtain data regarding the registration target 506 as described above. Further, the robotic system 100 can follow a predetermined protocol/format to create a new instance of the registration data 254 (e.g., a new entry or record in the master data 252 of FIG. 2) for the registration target 506. Accordingly, the robotic system 100 can store the obtained data in the new instance of the registration data 254. For example, the robotic system 100 can store the downward force measurement 604 as the weight, the estimated CoM 610 as the CoM, the edge length measurements 728 as horizontal dimensions, the corner angle measurements 730 or a derivative thereof as a horizontal shape, the updated data 740 as a surface image, or a combination thereof regarding the registration target 506.

The updated data 740 based on the comparison data 702 and the initial data provides improved object recognition. Using the comparison data 702, which is obtained after lifting the registration target 506, as a basis to generate the updated data 740 leads to accurate determination of object edges. The increased accuracy in determining the object edges further provides increased accuracy in determining the surface image and the various measurements described above. The improved accuracy in the obtained data and the surface image further increases the likelihood of subsequently recognizing the same type of objects based on the corresponding registration data 254. In some embodiments, obtaining and processing the comparison data 702 provides improved accuracy in measurements and surface image over processing the initial data alone or processing the state of the stack. Since the initial lift and/or horizontally transfer may disturb or move the objects surrounding the registration target 506, directly analyzing the registration target 506 instead of the remaining stack after the initial lift and/or horizontal transfer provides the improved accuracy.

Operational Flow for Registering with a Destination-Based Sensor

Figure 8:
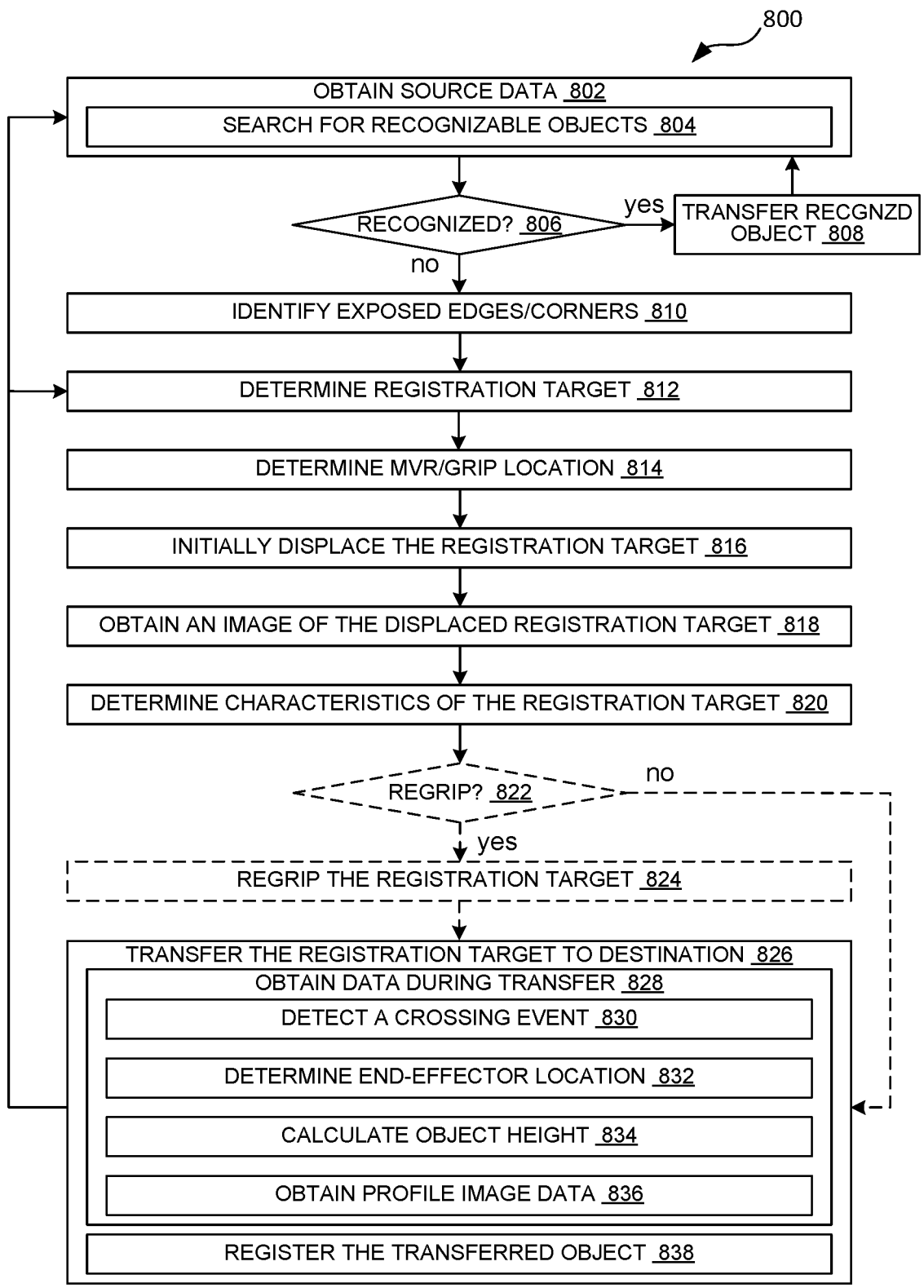
FIG. 8 is a flow diagram for a method of operating the robotic system of FIG. 1 in accordance with one or more embodiments of the present technology.

FIG. 8 is a flow diagram for a method 800 of operating the robotic system 100 of FIG. 1 in accordance with one or more embodiments of the present technology. The method 800 can be for registering unknown objects (e.g., the unrecognized objects 414 of FIG. 4B). In some embodiments, the method 800 can include registering the unrecognized objects 414 while or as part of transferring the unrecognized objects 414 from the start location 114 of FIG. 1 (e.g., the target stack 310 of FIG. 3) to the task location 116 of FIG. 1 (e.g., the conveyor 306 of FIG. 3). The method 800 can be implemented based on executing the instructions stored on one or more of the storage devices 204 of FIG. 2 with one or more of the processors 202 of FIG. 2.

At block 802, the robotic system 100 (e.g., the processors 202 and/or the sensors 216 of FIG. 2 therein) can obtain source data. For example, the robotic system 100 can obtain initial 2D and/or 3D representations of the target stack 310 (e.g., before manipulating/transferring one or more objects) at the start location 114. In some embodiments, the robotic system 100 can operate the first imaging sensor 312 of FIG. 3 and/or other sensors to generate the source data. Accordingly, the robotic system 100 can generate the top view data 420 of FIG. 4B, the sensor data 501 of FIG. 5A, etc. The robotic system 100 can communicate the source data between the sensors (e.g., the first imaging sensor 312) and the processors 202.

At block 804, the robotic system 100 can process the obtained source data to search for recognizable objects. For example, the robotic system 100 can compare the source data or derivations thereof to the master data 252 of FIG. 2. In some embodiments, the robotic system 100 can compare one or more 2D image data from the first imaging sensor 312 (e.g., corresponding the top view of the target stack 310) to surface images of known or expected objects in the master data 252.

At block 806, the robotic system 100 can determine whether the source data or any portion thereof matches aspects of known or expected objects represented in the master data 252. The robotic system 100 can determine the recognized objects 412 of FIG. 4B when the source data or derivations thereof matches entries (e.g., registration data representative of known objects) in the master data 252. Otherwise, the robotic system 100 can determine that one or more of the objects represented in the source data includes one or more of the unrecognized objects 414 of FIG. 4B.

At block 808, when objects are recognized, the robotic system 100 can further process the recognized objects 412, including transferring the recognized objects 412 to the task location 116 (e.g., the conveyor 306). In some embodiments, the robotic system 100 can further process the source data by determining locations, edges, center of gravity (CoG) location, gripping location, or a combination thereof of the recognized objects 412 based on the match. For example, the robotic system 100 can determine a location of the matching portion within the image and translate the location to a real-world location using a predetermined coordinate system, image-to-coordinate mapping function/equation, or other predetermined algorithms according to a known location of the imaging source. The robotic system 100 can further determine locations of edges (corresponding to, e.g., the registration-based edges 424 of FIG. 4) relative to the matching portions in the master data 252 and similarly translate the edge locations to the imaging output and/or the real-world locations/coordinates. Further, the robotic system 100 can search other aspects of the matching entry/object in the master data 252 to access the CoM location, the predetermined gripping location, or a combination thereof for transferring the recognized object 412.

The robotic system 100 can derive and/or implement motion plans to transfer the recognized objects 412 to the task location 116. For example, the robotic system 100 can use the location of the recognized objects 412 and/or the gripping locations described above to derive corresponding locations for the robotic arm 302 of FIG. 3 and/or the end-effector 304 of FIG. 3. The robotic system 100 can use the derived locations and current/projected locations for the robotic arm 302 and/or the end-effector 304 to further derive movements and/or corresponding actuator commands/settings. Similarly, the robotic system 100 can derive locations, movements, and/or corresponding actuator commands/settings for the robotic arm 302 and/or the end-effector 304 corresponding to lifting, horizontally displacing, lowering, and/or rotating the recognized objects 412 for transferring the recognized objects 412 from the start location 114 to the task location 116. The robotic system 100 can derive the motion plans based on combining the actuator commands/settings in sequence to transfer the recognized objects 412 from the start location 114 to the task location 116. The robotic system 100 can further derive the motion plans based on combining the transfer commands/settings with a predetermined sequence of movements and/or corresponding actuator commands/settings to grip and/or release objects. In some embodiments, the robotic system 100 can derive the motion plans to release the object based on a triggering signal from the second crossing sensor 318 of FIG. 3. The second crossing sensor 318 can be configured to generate the triggering signal when the bottom portion of the transferred object crosses a sensing line/plane that corresponds to a safe release height above the placement surface.

In some embodiments, the robotic system 100 can implement/execute the motion plan based on communicating the commands/settings with the robotic arm 302 and/or the end-effector 304. Accordingly, the robotic system 100 can execute the derived motion plan based on operating the actuation devices 212 of FIG. 2 and/or the transport motors 214 of FIG. 2 of the robotic arm 302 and/or the end-effector 304 according to the derived commands/settings. In some embodiments, the method 800 can return to block 802 and obtain updated source data after transferring one or more of the recognized objects 412. The method can iteratively implement the above-described processes (e.g., blocks 802-808) until all of the exposed and/or accessible recognized objects 412 (e.g., all recognized objects 412 in the top layer of the target stack 310) are transferred to the task location 116.

When none of the remaining exposed and/or accessible objects are recognized (e.g., correspond to or match entries in the master data 252), the robotic system 100 can identify exposed edges and/or corners of objects at the start location 114 as illustrated at block 810. In some embodiments, the robotic system 100 can process the source data (e.g., the 2D and/or the 3D imaging output) to determine differences in heights/orientations of surfaces that are exposed and/or accessible to the robotic arm 302. For example, the robotic system 100 can analyze the imaging output for patterns (e.g., continuous and/or linear patterns) in pixel brightness, pixel colors, height/depth measurements, etc. to identify the exposed edges 422 of FIG. 2. In some embodiments, for example, the robotic system 100 can process the imaging output with Sobel filters to identify the exposed edges 422. The robotic system 100 can similarly identify the exposed outer corners 426 of FIG. 4 as a junction or an intersection between two exposed edges having different orientations/slopes.

At block 812, the robotic system 100 can determine a registration target based on selecting one of the exposed outer corners 426. In other words, the robotic system 100 can determine one of the unrecognized objects 414 that is located at or that forms the selected exposed outer corner 426 as the registration target 506 of FIG. 5 for subsequent processing. The robotic system 100 can select one of the exposed outer corners 426 according to a predetermined pattern or a set of rules. For example, the robotic system 100 can select corners pointing toward and/or nearest to the robotic arm 302 or a base of the corresponding transfer unit 104 of FIG. 1. As further described below, the robotic system 100 can iteratively select the corners and process/transfer the corresponding registration target 506 until all of the unrecognized objects 414 have been removed, such as when all objects in a layer have been transferred.

At block 814, the robotic system 100 can determine the MVR 512 of FIG. 5 and/or the grip location 520 of FIG. 5 for the registration target 506 based on the source data. In some embodiments, the robotic system 100 can determine the MVR 512 according to the end-effector 304 and/or based on extending two or more intersecting lines from the exposed edges 422 as described above. The robotic system 100 can overlay the MVR 512 at one or more locations/orientations about the selected exposed outer corner 426 as described above. For example, the robotic system 100 can align one or more of the reference points (e.g., the corners) of the MVR 512 with the selected exposed outer corner 426. The robotic system 100 can overlay the MVR 512 such that at least a pair of non-parallel and adjacent edges of the MVR 512 overlap a pair of non-parallel and adjacent instances of the exposed edges 422. In some embodiments, the robotic system 100 can analyze the different overlaid locations/orientations of the MVR 512 to determine the grip location 520. For example, the robotic system 100 can determine the grip location 520 as a position/orientation of the MVR 512 where the MVR 512 does not overlap the detected lines 522 of FIG. 5, does not overlap the estimated edges 524 of FIG. 5, and/or satisfy a rule regarding a ratio of exposed surfaces as described above.

In some embodiments, the robotic system 100 can include the end-effector 304 that can adjust grip locations/areas, such as based on activating a partial grouping of the suction cups. For example, the robotic system 100 can individually activate suction cups or according to predetermined groupings that correspond to specific areas under the end-effector 304, such as left/right or top/bottom halves, quadrants/segments corresponding to outer corners of the end-effector 304, a center portion corresponding to a joint between the end-effector 304 and the robotic arm 302, or a combination thereof. Accordingly, the robotic system 100 can use the MVR 512 and/or the grip location 520 that corresponds to one or more of the predetermined groupings. For example, the robotic system 100 can derive one or more dimensions between the exposed edges 422 and the detected lines 522 and/or the estimated edges 524. The robotic system 100 can determine a largest grouping that can fit within the derived dimensions and select the corresponding MVR 512. The robotic system 100 can use the selected MVR 512 similarly as described above, such as by aligning the MVR 512 with a pair of non-parallel and adjacent instances of the exposed edges 422, to determine grip location 520.

At block 816, the robotic system 100 can initially displace the registration target 506. For example, the robotic system 100 can derive, implement, and/or execute a motion plan to grip the registration target 506 at the grip location 520 and initially lift and/or horizontally transfer the registration target 506. The robotic system 100 can derive, implement, and/or execute the motion plan similarly as described above, but displace the registration target 506 by a limited or a predetermined distance/direction instead of transferring to the task location 116. For example, the robotic system 100 can lift and/or horizontally transfer the registration target 506 over a predetermined distance. Also, the robotic system 100 can lift and/or horizontally transfer the registration target 506 at least until the downward force measurement 604 stabilizes and/or until continuous imaging results indicate newly distinguishable edges as described above.

At block 818, the robotic system 100 can obtain data (e.g., an imaging result, such as the comparison data 702 of FIG. 7) of the displaced registration target 506. In some embodiments, the robotic system 100 can obtain the imaging data from the first imaging sensor 312 above the target stack 310 after initially lifting and/or horizontally displacing the registration target 506.

Since the registration target 506 has been vertically and/or horizontally separated from adjacent or surrounding objects, the comparison data 702 can clearly capture the edges of the registration target 506 that were previously adjacent to or abutting other objects/surfaces (e.g., the discovered edges 722 of FIG. 7). Accordingly, at block 820, the robotic system 100 can determine characteristics of the registration target 506. In some embodiments, the robotic system 100 can process the obtained imaging result to determine visual or outer characteristics. For example, the robotic system 100 can determine the discovered edges 722 and/or the discovered corners 726 of FIG. 7 as described above, such as based on detecting edges represented in the comparison data 702. Also, the robotic system 100 can calculate the edge length measurements 728 of FIG. 7, determine the corner angle measurements 730 of FIG. 7, and/or generate the updated data 740 of FIG. 7 as described above. Further, in some embodiments, the robotic system 100 can obtain and process other data, such as force and/or torque measurements. For example, the robotic system 100 can obtain the data representative of outputs from the force-torque sensor 602 of FIG. 6, such as the downward force measurement 604 of FIG. 6 and/or the torque measurement 606 of FIG. 6. The robotic system 100 can use the data to determine the weight and/or the estimated CoM 610 of FIG. 6 of the registration target 506.

In some embodiments, as illustrated at block 822, the robotic system 100 can determine whether to regrip the registration target 506. For example, the robotic system 100 can compare the downward force measurement 604 and/or the torque measurement 606 to one or more thresholds to determine whether to regrip the registration target 506. Also, the robotic system 100 can determine a separation distance between the grip location 520 and the estimated CoM 610 and adjust the thresholds accordingly for the comparison. In one or more embodiments, the robotic system 100 can further determine and process a grip measure (e.g., measurements of vacuum between the suction cups and the gripped surface) in determining whether to regrip the registration target 506.

When the processing results corresponding to the weight, the torque, the grip, and/or the estimated CoM 610 exceeds one or more threshold conditions, the robotic system 100 can regrip the registration target 506 as illustrated at block 824. The robotic system 100 can regrip the registration target 506 based on transferring the registration target 506 back to the original position and releasing the grip. The robotic system 100 can redetermine the grip location 520 to be over the estimated CoM 610. In some embodiments, the robotic system 100 can adjust the grip location 520 away from the selected exposed outer corner 426 according to the estimated torque-arm vector 608 of FIG. 6. In some embodiments, the processes illustrated in blocks 822 and 824 (illustrated using dashed lines) may be optionally implemented or excluded from the method 800. As such, in some embodiments, the method 800 may transition from block 820 to block 826 without implementing blocks 822 and 824.

At block 826, the robotic system 100 can transfer the registration target 506 to the destination from the current location thereof. In some embodiments, the robotic system 100 can transfer the registration target 506 after the initial lift/horizontal transfer without regripping and/or considering to regrip the registration target 506. The robotic system 100 can also transfer the registration target 506 after regripping. In some embodiments, the robotic system 100 can determine that the current grip location is sufficient to transfer the registration target 506, such as when the compared values are below the threshold conditions.

The robotic system 100 can transfer the registration target 506 similarly as described above for transferring the recognized objects 412. For example, the robotic system 100 can derive, implement, and/or execute motion plans, thereby operating the robotic arm 302 and/or the end-effector 304 to transfer the registration target 506 from a current location to the task location 116. In some embodiments, the robotic system 100 can derive, implement, and/or execute the motion plans based on the characteristics determined at block 820. For example, the robotic system 100 can control a transfer speed according to the determined weight of the registration target 506. In some embodiments, the robotic system 100 can derive, implement, and/or execute the motion plans based on a grip measure and/or a change in the characteristics determined at block 820. For example, the robotic system 100 can reduce the transfer speed and/or place the registration target 506 at a designated/determined location when the grip measure reduces or falls below a threshold. Also, the robotic system 100 can reduce the transfer speed and/or place the registration target 506 at a designated/determined location based on detecting changes in the torque measurement and/or the weight, such as when a portion of the object falls (e.g., bottom or contents in the package), contents in the object shifts, and/or the object shifts relative to the end-effector due to grip failure during transfer.

At block 828, the robotic system 100 can obtain additional data during the transfer. The additional data can include information regarding physical characteristics of the registration target 506 that may not be represented in the initial source data, such as information regarding vertical edges, dimensions, and/or surfaces.

At block 830, the robotic system 100 can detect a crossing event and a corresponding time stamp while implementing the operation such that the detected events contemporaneously correspond to the operation. The crossing event can correspond to a bottom portion of the registration target 506 crossing/entering a sensing line/plane (e.g., a lateral or a horizontal line/plane) of the first crossing sensor 316 of FIG. 3 located above and overlapping the task location 116. The robotic system 100 can use the crossing event or a corresponding time marker in determining other physical characteristics of the registration target 506 that may not have been captured in the preceding imaging data.

At block 832, the robotic system 100 can determine the end-effector location at the time of the crossing event. In some embodiments, the robotic system 100 can track or estimate the locations of the end-effector 304 across time while executing the motion plan. For example, the robotic system 100 can derive and/or track the current location of the end-effector 304 as one or more sets of coordinates (e.g., according to a predetermined grid or mapping of space associated with the robotic system 100). Also, the robotic system 100 can derive or track the current location of the end-effector 304 based on tracking progress for the corresponding motion plan. Accordingly, the robotic system 100 can determine the end-effector location (e.g., x-y-z coordinate values as represented in FIG. 3) corresponding to the time marker of the crossing event. In some embodiments, the robotic system 100 can use the crossing event or the corresponding output from the first crossing sensor 316 as a trigger to derive or obtain the gripper height 322 of FIG. 3. For example, the robotic system 100 can use the vertical coordinate value (e.g., coordinate value along the y-axis) to derive or obtain the gripper height 322.

At block 834, the robotic system 100 can use the gripper height 322 to calculate the object height 620 of FIG. 6 (e.g., the height of the registration target 506). For example, the robotic system 100 can calculate the object height 620 based on calculating a difference between the gripper height 322 at the time of the crossing event and the crossing reference height 324 of FIG. 3 (e.g., a previously known and stored value).

In some embodiments, as illustrated at block 836, the robotic system 100 can use the crossing event as a trigger to obtain profile data (e.g., data representative of a side-view, such as regarding edges and/or surfaces) of the registration target 506. For example, the robotic system 100 can include one or more horizontally-facing sensors/cameras directed toward the task location 116 and spaces corresponding to the crossing event. Accordingly, the profile data can include images (e.g., profile image data) of the registration target 506 from the horizontally-facing sensors/cameras. As a specific example, the robotic system 100 can use the time marker to identify a time in a video feed from the horizontally-facing sensors and/or trigger the horizontally-facing sensors to capture an image. Based on the image, the robotic system 100 can obtain additional information (e.g., the object height 620 and/or one or more surface images) regarding vertical edges/surfaces of the registration target 506 that may not have been detectable for downward-facing sensors (e.g., the first imaging sensor 312 and/or the second imaging sensor 314).

In some embodiments, the robotic system 100 can use the object height 620 of the registration target 506 to re-derive the motion plan and/or adjust implementation/execution thereof. For example, since the object height 620 may affect acceleration, the robotic system 100 can calculate a transfer speed/acceleration (e.g., a maximum transfer speed/acceleration) that corresponds to the object height 620 of the registration target 506. The robotic system 100 can re-derive or adjust the motion plan (e.g., the commands, the settings, and/or a sequence thereof) according to the calculated transfer speed/acceleration and implement/execute accordingly. By using a crossing sensor (e.g., the first crossing sensor 316 of FIG. 3) to determine the object height 620 during transfer, the robotic system 100 can accurately account for any changes in shapes/dimensions of the objects during transfer. Thus, the robotic system 100 can use the actual object height 620 (e.g., height of the object when suspended instead of the height at rest) in transferring the objects, thereby reducing/eliminating any collisions associated with the changes in the shapes.

At block 838, the robotic system 100 can register the transferred object (e.g., the registration target 506), such as based on creating and/or populating a new instance of the registration data 254 corresponding thereto. The new registration data 254 can represent a new record for the registration target 506 (e.g., a previously unrecognized object 414). In some embodiments, the robotic system 100 can additionally compare the obtained information, including the profile data or processing results thereof (e.g., height measurements and/or the surface images), with the entries in the master data 252. When the comparison matches, the robotic system 100 can update the recognition status of the registration target 506 to the recognized object 412. Otherwise, the robotic system 100 can continue to register the previously unrecognized object. The robotic system 100 can register the registration target 506 by storing in the master data 252 the obtained information on the physical characteristics of the registration target 506. For example, the robotic system 100 can create an entry for the registration data 254 during or before transfer (e.g., as part of determining the registration target at block 812). The robotic system 100 can store the obtained data, such as the weight (e.g., the downward force measurement 604), the estimated CoM 610, the edge length measurements 728, the corner angle measurements 730, the updated data 740 and/or other imaging data, or a combination thereof, in the created entry. The robotic system 100 can finalize and/or store the registration data 254 when the registration target 506 is placed on the task location 116 and/or released from the end-effector 304.

In some embodiments, the method 800 can iteratively transfer and register a group of unrecognized objects from one image. Accordingly, after transferring and registering one unknown object, the method 800 can determine a new registration target from amongst the remaining unrecognized objects 414 as illustrated by a feedback path to block 812. In some embodiments, as illustrated by a feedback path to block 802, the method 800 can include reimaging the start location 114 after transferring and registering an unknown object.

Object Transfer and Registration with a Source-Based Sensor

Figure 9:
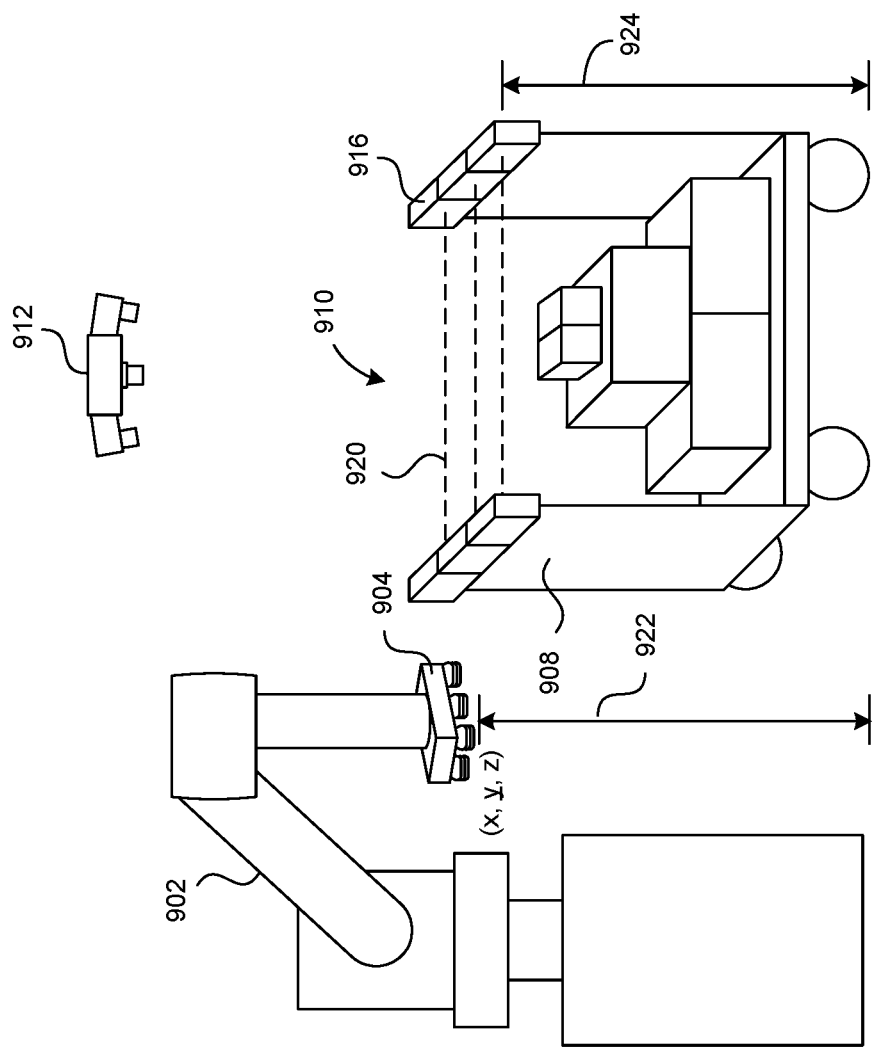
FIG. 9 is an illustration of the robotic system in accordance with one or more embodiments of the present technology.
Figure 9:
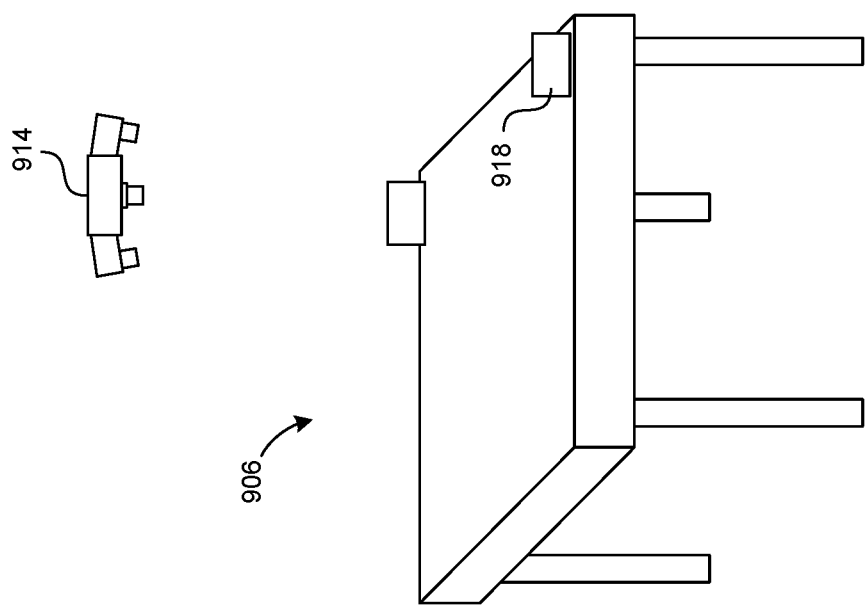

FIG. 9 is an illustration of the robotic system 100 of FIG. 1 in accordance with one or more embodiments of the present technology. Aspects of the robotic system 100 illustrated in FIG. 9 can be similar to those illustrated in FIG. 3, but with one or more sensors located at different locations.

The robotic system 100 can include a robotic arm 902 (e.g., an instance of the transfer unit 104 of FIG. 1) that includes an end-effector 904 (e.g., a gripper). The robotic arm 902 can be configured to transfer the target object 112 of FIG. 1 between the start location 114 of FIG. 1 and the task location 116 of FIG. 1. In some embodiments, the start location 114 can correspond to a container 908 (e.g., a walled-cart) with a target stack 910 (e.g., a grouping of objects that can include the target object 112) thereon. The task location 116 for the robotic arm 902 can be a placement location (e.g., a starting/egress point) on a conveyor 906 (e.g., an instance of the transport unit 106 of FIG. 1). For example, the robotic arm 902 can be configured to pick the objects from the target stack 910 and place them on the conveyor 906 for transport to another destination/task.

The robotic system 100 can use one or more of the sensors 216 of FIG. 2 in performing the transfer operation with the robotic arm 902. In some embodiments, the robotic system 100 can include a first imaging sensor 912 and/or a second imaging sensor 914. The first imaging sensor 912 can include one or more 2D and/or 3D sensors, such as cameras and/or depth sensors, configured to image and/or analyze the start location 114. The second imaging sensor 914 can include one or more 2D and/or 3D sensors, such as cameras and/or depth sensors, configured to image and/or analyze the task location 116. For example, the first imaging sensor 912 can include one or more cameras and/or depth sensors located at a known location above and facing the start location 114. The first imaging sensor 912 can generate imaging data corresponding to one or more top views of the start location 114, such as a top view of the target stack 910. Also, the second imaging sensor 914 can include one or more cameras and/or depth sensors located at one or more known locations above/lateral to and facing the task location 116. Accordingly, the second imaging sensor 914 can generate imaging data corresponding to one or more top and/or side views of the target object 112 that are at or within a threshold distance from the task location 116.

In some embodiments, the robotic system 100 can include one or more crossing sensors (e.g., a source crossing sensor 916 and/or a release point sensor 918) configured to detect crossing events where an object crosses/leaves corresponding sensing line/plane (e.g., a crossing reference 920). For example, crossing sensors can correspond to line or plane sensors that detect crossing events based on continuity/disruption in transmitted and/or reflected signals (e.g., optical signals, laser, etc.). The crossing sensors, in some embodiments, can transmit optical signals along a sensing line and detect and/or reflect the transmitted signals at an end of the sensing line, thereby establishing the crossing references 920. Accordingly, the crossing sensors can detect disruptions (e.g., discontinuity) in receiving the transmitted optical signals, which can correspond to an entry event representing an object crossing/entering the sensing line. Similarly, the crossing sensors can re-detect the transmitted signals following a period of disruption, which can correspond to an exit event that represents the object exiting the sensing line.

In some embodiments, the release point sensor 918 can be used to release the gripped object. The release point sensor 918 can be located above the task location 116 and/or establish the sensing line at a predetermined height. The height of the sensing line can be for safely dropping objects without damaging the objects. As an example, the height for the sensing line can be 10 cm or less above the placement location on the conveyor 906. Accordingly, the robotic system 100 can use the crossing event detected by the release point sensor 918 as a trigger to release the carried object from of the end-effector 304.

In some embodiments, the source crossing sensor 916 can be used to measure the object height 620 of FIG. 6 of the target object 112 during transfer. For example, the robotic system 100 can determine a gripper height 922 (e.g., a vertical position/location of the end-effector 904 relative to a reference point, such as the ground) at the time of a crossing event (e.g., an exit event) as detected by the source crossing sensor 916. The robotic system 100 can compare the gripper height 922 to a crossing reference height 924 (e.g., a known vertical position of the source crossing sensor 916 and/or the crossing reference 920) to calculate the object height 620 of the target object 112 that is being transferred. In other words, the source crossing sensor 916 can act as a trigger that indicates a time when a bottom portion of the target object 112 exits the sensing line. Accordingly, the robotic system 100 can use the gripper height 922 at such time and the known height of the crossing reference 920 to calculate the object height 620 of the target object 112. In some embodiments, the source crossing sensor 916 can trigger one or more sensors (e.g., 2D and/or 3D cameras) to collect data when the bottom portion of the target object 112 crosses the sensing line. Accordingly, the robotic system 100 can obtain data regarding the object from different points of view (e.g., side or profile views/images, shape measurements along a different dimension, etc. from horizontally directed cameras).

For illustrative purposes, the source crossing sensor 916 is shown attached to the container 908. However, it is understood that the source crossing sensor 916 can be configured differently (e.g., independent of apparatus/containers at the start location 114). The source crossing sensor 916 can include one or more devices located at or near the start location 114 and configured to detect crossing events relative to a line/plane (e.g., the crossing reference 920 at the crossing reference height 924) above and/or overlapping the start location 114. In some embodiments, the source crossing sensor 916 can be configured to detect crossing events relative to a line/plane that is above a placement surface/location by a relatively short distance (e.g., less than one meter, such as 10 centimeters).

In some embodiments, the robotic system 100 can include and/or interact with one or more further sensors directed at the start location 114. For example, the robotic system 100 can include one or more horizontally-facing 2D/3D imaging devices configured to obtain additional information (e.g., images of one or more vertical surfaces and/or profile shapes) of the objects and/or the target stack 910. The horizontally-facing 2D/3D imaging devices can be configured to obtain profile/side views about the object of the objects when exiting the crossing reference 920.

The source crossing sensor 916 and/or the further sensors provide additional data of objects (e.g., unrecognized objects) during transfer. As described above, the source crossing sensor 916 can be used to calculate the object height 620 of the transferred object without any additional maneuvers/movements in transferring the object. Further, determining the object height 620 after lifting the object provides increased accuracy in the height measurements since some objects may deform when they are resting on top of another object. Further, the source crossing sensor 916 can trigger the further sensors to obtain the information about the object that may not be detectable by the first imaging sensor 912 and/or the second imaging sensor 914. As described in detail below, the object height 620 and/or the additional information can be used to generate the registration data 254 of FIG. 2 for unrecognized objects. Accordingly, the robotic system 100 can obtain more information about unrecognized objects, which can be used to increase likelihood of subsequent recognitions of other like objects and/or to increase accuracy in further manipulating the object, without disturbing the transfer task.

In some embodiments, the robotic system 100 can use the object height 620 and/or the additional information to re-analyze and recognize the object, such as by analyzing other surfaces (e.g., vertical surfaces/dimensions) of the object in addition to the top surface. Accordingly, the robotic system 100 can reduce the number of unrecognized boxes or false negative results.

Processing States for a Source-Based Sensor

FIG. 10A-FIG. 10D illustrate various processing states for describing various example processing states for utilizing the source crossing sensor 916 of FIG. 9. The robotic system 100 of FIG. 1 can operate the source crossing sensor 916 according to a location/height of the end-effector 904 and/or the target object 112 of FIG. 1.

Figure 10A:
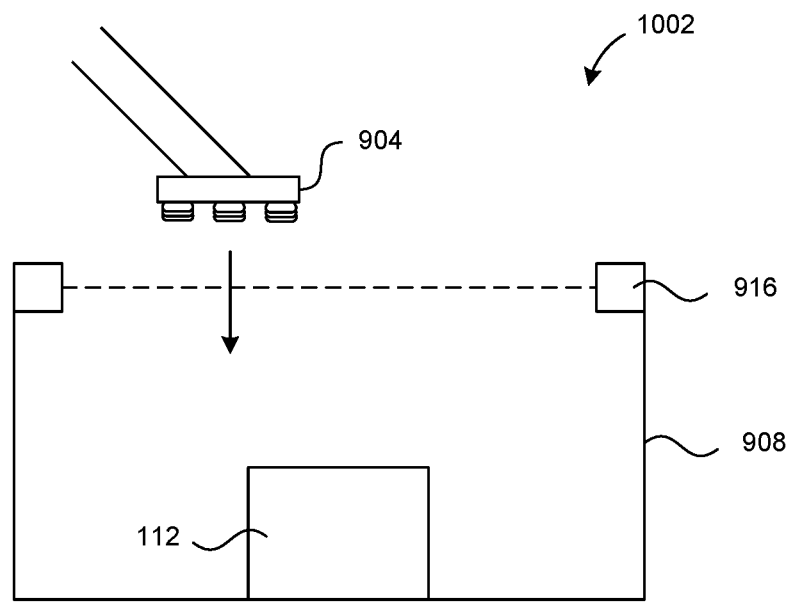
FIG. 10A is an illustration of an approach operation in accordance with one or more embodiments of the present technology.

FIG. 10A represents an initial state 1002 corresponding to the robotic arm 902 of FIG. 9 and/or the end-effector 904 located above and/or outside the container 908. The initial state 1002 can represent one or more outputs from a sensor corresponding to the laterally-oriented crossing reference. The initial state 1002 can correspond to the robotic arm 902 beginning to reach into the container 908 for grip and pick up the target object 112. Accordingly, the robotic system 100 can turn off and/or ignore the outputs from the source crossing sensor 916 during the initial state 1002.

Figure 10B:
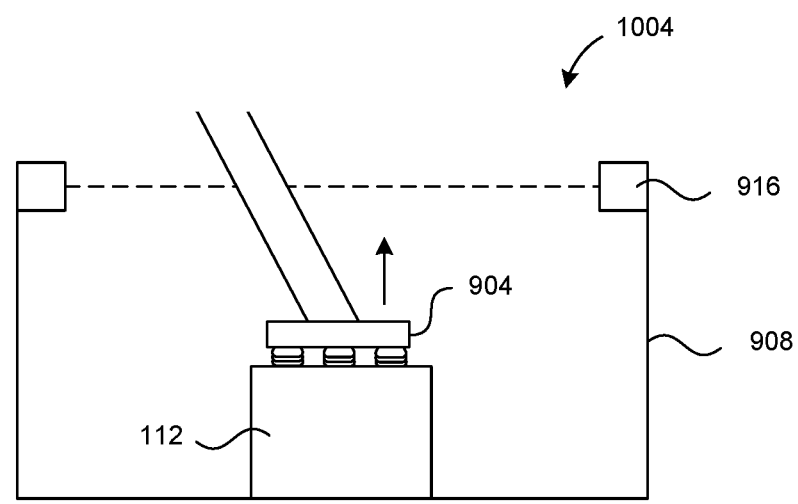
FIG. 10B is an illustration of a lift operation in accordance with one or more embodiments of the present technology.

FIG. 10B represents an approach state 1004 corresponding to the robotic arm 902 of FIG. 9 crossing into and below a top portion of the container 908, contacting and gripping the target object 112, and/or initially lifting the target object 112. For example, the approach state 1004 can represent the end-effector 904 being over the target object 112 (e.g., within a boundary associated with the start location 114 of FIG. 1) and/or below the crossing reference height 924 of FIG. 9. In some embodiments, the robotic system 100 can continue to leave the crossing sensor off and/or ignore the outputs thereof during the approach state 1004.

Figure 10C:
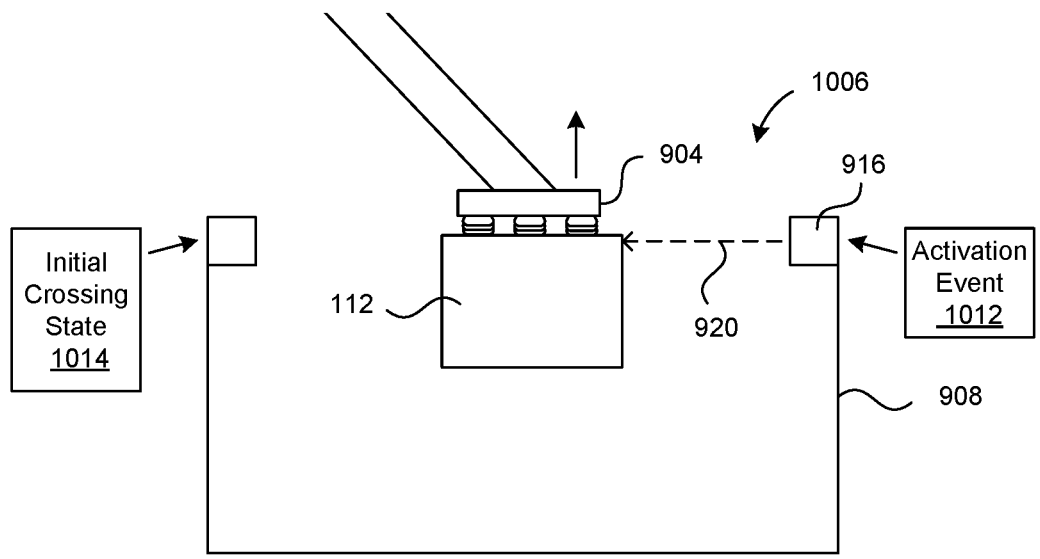
FIG. 10C is an illustration of an activation event in accordance with one or more embodiments of the present technology.

FIG. 10C represents a crossing state 1006 corresponding to the target object 112 crossing or entering the crossing reference 920. The robotic system 100 can track the gripper location (e.g., a set of coordinate values, such as x-y-z values illustrated in FIG. 9), including the gripper height 922 of FIG. 9, while operating the robotic arm 902. When the gripper height 922 exceeds the crossing reference height 924 of FIG. 9, the robotic system 100 can generate an activation event 1012 to turn the source crossing sensor 916 on. The output from the source crossing sensor 916 can correspond to an initial crossing state 1014 with the target object 112 crossing or entering the crossing reference 920.

In some embodiments, the robotic system 100 can generate the activation event 1012 and/or determine the initial crossing state 1014 following the initial state 1002 (e.g., during the approach state 1004) since the robotic arm 902 is across the crossing reference 920. In other words, the robotic system 100 can generate the activation event 1012 and/or determine the initial crossing state 1014 when the end-effector 904 is over the container 908 and when the gripper height 922 is less than the crossing reference height 924.

Figure 10D:
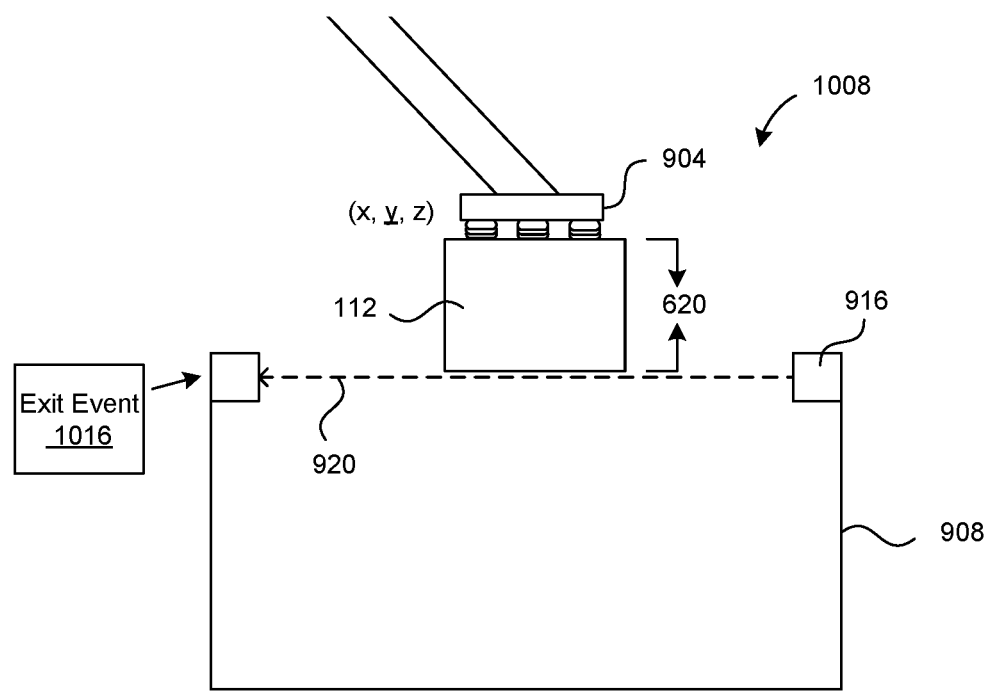
FIG. 10D is an illustration of a detection event in accordance with one or more embodiments of the present technology.

FIG. 10D represents a clearing state 1008 corresponding to the target object 112 exiting or clearing the crossing reference 920. The clearing state 1008 can correspond to an exit event 1016 detected by the source crossing sensor 916. For example, the transmitted light/laser signal can be detected by the source crossing sensor 916 when the bottom portion of the target object 112 is above the crossing reference 920.

The robotic system 100 can use the exit event 1016 or a timing thereof (i.e. a timestamp corresponding to the exit event 1016) to calculate an object height 620 of the target object 112. The processing for calculating the object height 620 using the information from the source crossing sensor 916 can be similar to that of the height calculation using information from destination crossing sensors (e.g., the first crossing sensor 316 of FIG. 3). For example, the robotic system 100 can determine the gripper height 922 at the time of the exit event 1016. The robotic system 100 can calculate the object height 620 based on a difference between the gripper height 922 and the crossing reference height 924 (e.g., a known/predetermined value) at the time of the exit event 1016.

Operational Flow for Registering with a Source-Based Sensor

Figure 11:
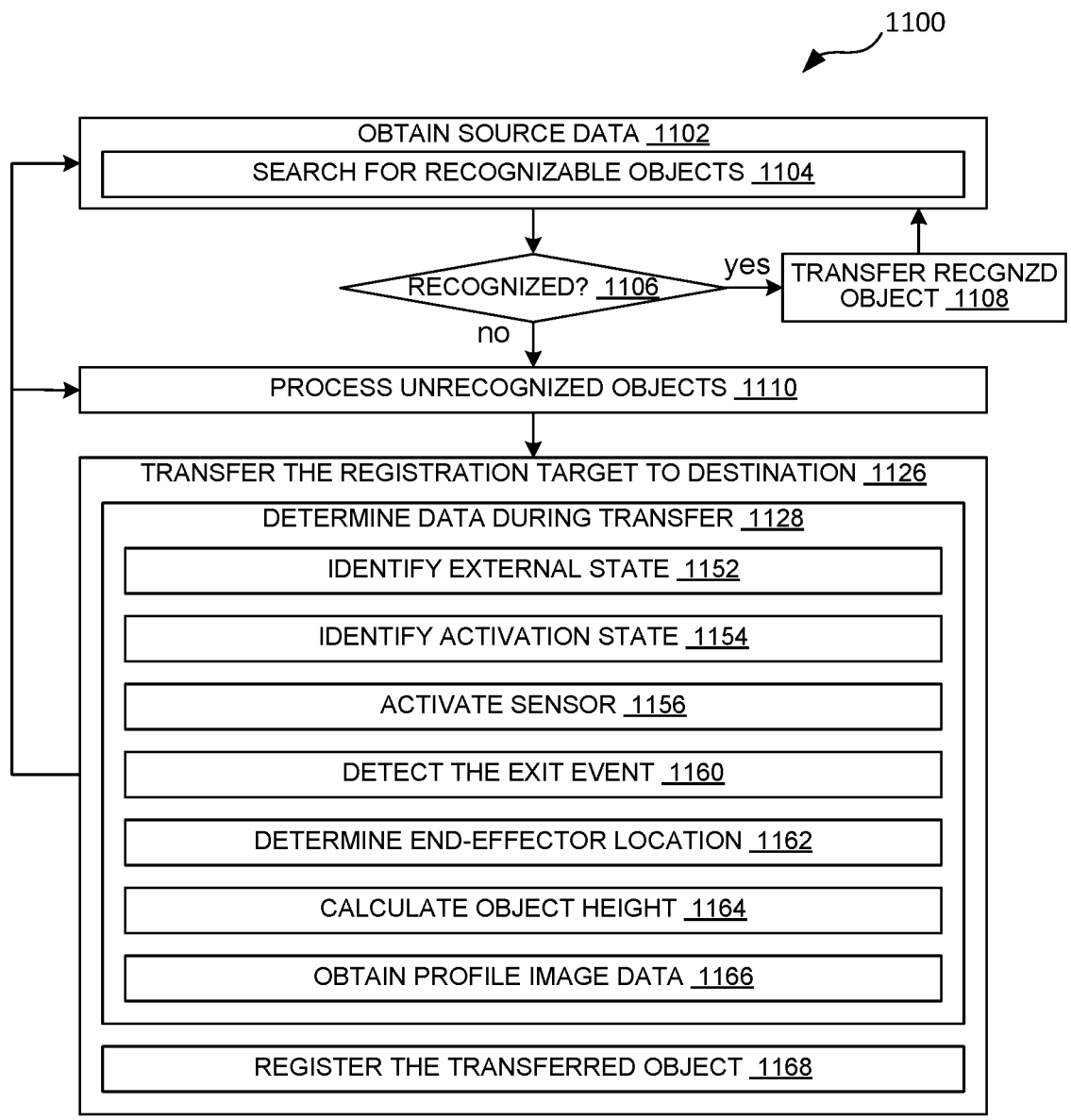
FIG. 11 is a further flow diagram for a method of operating the robotic system of FIG. 1 in accordance with one or more embodiments of the present technology.

FIG. 11 is a further flow diagram of a method 1100 for operating the robotic system 100 of FIG. 1 in accordance with one or more embodiments of the present technology. The method 1100 can be implemented based on executing the instructions stored on one or more of the storage devices 204 of FIG. 2 with one or more of the processors 202 of FIG. 2.

The method 1100 can be for registering unknown objects (e.g., the unrecognized objects 414 of FIG. 4B). In some embodiments, the method 1100 can include registering the unrecognized objects 414 while or as part of transferring the unrecognized objects 414 from the start location 114 of FIG. 1 (e.g., the target stack 910 of FIG. 9) to the task location 116 of FIG. 1 (e.g., the conveyor 906 of FIG. 9). Further, the method 1100 can include processing the various states and data illustrated in FIG. 10A-FIG. 10D. The method 1100 can be similar to the method 800 of FIG. 8 except for utilizing the source crossing sensor 916 of FIG. 9 instead of the first crossing sensor 316 of FIG. 3 to obtain data regarding the transferred object.

At block 1102, the robotic system 100 can obtain the source data similarly as described above for block 802 of FIG. 8. At block 1104, the robotic system 100 can search for recognizable objects similarly as described above for block 804 of FIG. 8. At block 1106, the robotic system 100 can determine whether the obtained source data represents any recognized objects 412 of FIG. 4B similarly as described above for block 806 of FIG. 8. At block 1108, the robotic system 100 can transfer the recognized objects 412 similarly as described above for lock 808 of FIG. 8.

At block 1110, the robotic system 100 can process the unrecognizable objects similarly as described above for blocks 810-824 of FIG. 8. For example, the robotic system 100 can identify exposed edges and/or corners, determine registration targets, determine MVRs and/or grip locations, initially displace the registration targets, obtain an updated image of the displaced registration target, determine characteristics of the registration target, and/or regrip the registration targets.

At block 1126, the robotic system 100 can transfer the registration target 506 to the destination similarly as described above for block 826 of FIG. 8. At block 1128, the robotic system 100 can determine further data during the transfer, such as by using the source crossing sensor 916. For example, the robotic system 100 can determine one or more states (e.g., the initial state 1002, the approach state 1004, the crossing state 1006, and/or the clearing state 1008 illustrated in FIG. 10A-FIG. 10D) and activate/deactivate the source crossing sensor 916 accordingly.

At block 1152, the robotic system 100 can identify an external state (e.g., the initial state 1002) in which the end-effector 904 has not yet entered a monitored space associated with the start location 114. In other words, the robotic system 100 can identify the initial state 1002 before a bottom portion of the end-effector 904 crosses below the crossing reference 920 and/or before the end-effector 904 is over the registration target 506 (e.g., when the end-effector 904 is outside of a boundary associated with the start location 114). The robotic system 100 can determine the initial state 1002 based on tracking the location and/or the height of the end-effector 904 during operation (e.g., while implementing and/or executing the motion plan) and comparing the tracked height or a derivation thereof (e.g., an offset for locating the lower-most portion) to the crossing reference height 924. The robotic system 100 can determine the initial state 1002 when the tracked height or the derivation thereof is above the crossing reference height 924. Accordingly, the robotic system 100 can deactivate the source crossing sensor 916 and/or keep the source crossing sensor 916 in a deactivated state.

At block 1154, the robotic system 100 can identify an activation state (e.g., the approach state 1004 and/or the crossing state 1006) in which the end-effector 304 or a reference portion thereof is below the crossing reference 920. In other words, the robotic system 100 can identify the activation state when a bottom portion of the end-effector 904 is below the crossing reference 920. The robotic system 100 can determine the activation state when the tracked height or a derivation thereof is below the crossing reference height 924. The robotic system 100 can determine the activation state immediately following the external state and/or when the horizontal position of the end-effector 904 overlaps or is within a predetermined distance from the start location 114.

At block 1156, the robotic system 100 can activate one or more sensors (e.g., the source crossing sensor 916 and/or the further sensors). Based on identifying the activation state, the robotic system 100 can activate the source crossing sensor 916 and/or the imaging devices directed toward the start location 114, such as for the activation event 1012 of FIG. 10C. Accordingly, the robotic system 100 can expect or determine a crossing event (e.g., the initial crossing state 1014 of FIG. 10C) corresponding to the robotic arm 902, the end-effector 904, and/or the registration target 506 crossing, entering, and/or having a portion thereof intersecting the crossing reference 920.

At block 1160, the robotic system 100 can detect the exit event 1016 of FIG. 10D corresponding to the clearing state 1008. The robotic system 100 can continue to transfer the registration target 506 with the source crossing sensor 916 and/or the further sensors in an activated state. In other words, the robotic system 100 can continue to lift the registration target 506 after the activation event 1012 and/or determining the initial crossing state 1014. Accordingly, while lifting the registration target 506, the robotic system 100 can use the source crossing sensor 916 to detect the exit event 1016 when the registration target 506 exits or no longer intersects the crossing reference 920 located above and overlapping the start location 114. For example, the source crossing sensor 916 can detect the exit event 1016 based on detecting transmitted signals (e.g., optical signals, such as laser) that were previously obstructed by the registration target 506. Accordingly, the source crossing sensor 916 can communicate the exit event 1016 to the processors 202 and/or a time stamp of the event.

At block 1162, the robotic system 100 can determine an end-effector location (e.g., the gripper height 922) at the time of the exit event 1016. In some embodiments, the robotic system 100 can continuously track and/or record the end-effector location while operating the end-effector 904 (e.g., while implementing/executing the motion plan). Accordingly, the robotic system 100 can use the exit event 1016 as a trigger to sample or mark the tracked coordinates. In other words, the robotic system 100 can obtain the tracked coordinates of the end-effector 904 when the exit event 1016 is detected by the source crossing sensor 916 and/or is received at the processors 202. In some embodiments, the robotic system 100 can use the time stamp of the event to look up the recorded end-effector coordinates to determine the end-effector location. In some embodiments, the robotic system 100 can calculate one or more estimated times for the end-effector locations based on the motion plan and one or more reference times (e.g., initiating, ending, and/or reference time markers for the motion plan). Accordingly, the robotic system 100 can calculate, estimate, or extrapolate the end-effector location at the time of the exit event 1016 based on the motion plan and the one or more reference times. Based on the end-effector location at the time of the exit event, the robotic system 100 can use the vertical coordinate value thereof to determine the gripper height 922.

At block 1164, the robotic system 100 can calculate the object height based on the end-effector location (e.g., the gripper height 922) at the time of the exit event 1016. For example, the robotic system 100 can calculate the height of the registration target 506 based on calculating a difference between the gripper height 922 at the time of the exit event 1016 and the crossing reference height 924 (e.g., a previously known and stored value).

In some embodiments, as illustrated at block 1166, the robotic system 100 can use the exit event 1016 to obtain further data regarding the registration target 506. For example, the robotic system 100 can use the exit event 1016 as a trigger to obtain the profile data (e.g., 2D/3D imaging data, such as a side-view image of the registration target 506) from the further sensors (e.g., horizontally-facing 2D/3D cameras directed at or above the start location 114). Also, the robotic system 100 can use the time stamp of the exit event 1016 to search a recorded image stream (e.g., video feed) from the further sensors to obtain the further data. Accordingly, the robotic system 100 can obtain further information (e.g., the height and/or one or more of the surface images/representations) regarding vertical edges/surfaces/shapes of the registration target 506 (such as a change in shape) that may not have been detectable for downward-facing sensors (e.g., the first imaging sensor 912 and/or the second imaging sensor 914).

In one or more embodiments, the robotic system 100 can process the obtained profile data to calculate the height of the registration target 506. For example, the robotic system 100 can determine a length of one or more vertical edges in the image and map/translate the length to real-world measurements according to a predetermined function and/or equation. The robotic system 100 can use the height calculated from the profile data instead of the height calculated based on timing. The robotic system 100 can also use the height calculated from the image to verify or reinforce the height calculated based on timing.

At block 1168, the robotic system 100 can register the transferred object (e.g., the registration target 506), such as based on creating and/or populating the registration data 254 of FIG. 2 corresponding thereto. The robotic system 100 can register the registration target 506 by storing in the master data 252 the obtained information of the physical characteristics of the registration target 506. For example, the robotic system 100 can create an entry for the registration data 254 during or before transfer (e.g., as part of processing the unrecognizable objects at block 1110). The robotic system 100 can store the obtained information, such as the weight (e.g., the downward force measurement 604 of FIG. 6), the estimated CoM 610 of FIG. 6, the edge length measurements 728 of FIG. 7A, the corner angle measurements 730 of FIG. 7A, the updated data 740 of FIG. 7B and/or other imaging data, or a combination thereof, in the created entry. The robotic system 100 can finalize and/or store the registration data 254 when the registration target 506 is placed on the task location 116, released from the end-effector 904, and/or after determining and storing the information regarding vertical edges/surfaces (e.g., the height and/or the surface images) of the registration target 506.

In some embodiments, the method 1100 can iteratively transfer and register a group of the unrecognized objects 414 from one image. Accordingly, after transferring and registering one of the unrecognized objects 414, the method 1100 can determine a new registration target from amongst the remaining unrecognized objects 414 as illustrated by a feedback path to block 1110. In some embodiments, as illustrated by a feedback path to block 1102, the method 1100 can include reimaging the start location 114 after transferring and registering one of the unrecognized objects 414.

Using the horizontally-directed crossing sensors (e.g., the first crossing sensor 316 of FIG. 3 and/or the source crossing sensor 916) to determine the heights of the unrecognized objects 414 provides additional information about the unrecognized objects 414 while reducing the errors and minimizing/eliminating impact to the task executions. As discussed above for processing stack top views, analyzing the side-view images of the overall stack (i.e. the target stack 910) to determine heights of individual objects can lead to errors due to indistinguishable edges/boundaries of each object. Accordingly, the crossing sensors provide mechanisms to determine the heights of the transferred objects without processing the side-view images of multiple stacked objects. Further, in some embodiments, the robotic system 100 can use the timing of the crossing/exiting events to determine the height, which generally provides lower resource consumption than obtaining and processing additional images to determine the height. Moreover, since the robotic system 100 obtains the various above-described registration data while transferring the unrecognized objects 414, the robotic system 100 can register the unrecognized objects 414 with minimal to no impact on the overall time/resources necessary to complete the overall tasks (e.g., to transfer the objects in the target stack to the task location 116).

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A method for operating a robotic system, the method comprising:
   receiving an image data representative of a surface of an object located at a start location;
   determining a minimum viable region based on the image data for gripping and lifting the object;
   obtaining data representing the object after implementation of an initial lift based on the minimum viable region to vertically displace the object;
   implementing operations to transfer the object to a task location;
   detecting an event and a corresponding time stamp while implementing the operation, wherein the event represents (1) an entry or an exit of the object relative to a laterally-oriented crossing reference located at a crossing reference height and (2) an output from a crossing sensor configured to detect optical signals transmitted along a line or a plane corresponding to the laterally oriented crossing reference;
   determining a gripper height corresponding to the event, wherein the gripper height represents a vertical location of an end-effector;

calculating an object height of the object based on the event, the gripper height, and/or the predetermined reference height; and creating new registration data representative of a new record for the object, wherein the new registration data includes the object height.

2. The method of claim 1, further comprising obtaining profile data based on the event, wherein the profile data represents an output from a laterally-facing sensor configured to obtain information regarding a vertical edge, a vertical surface, or a combination thereof of the object.

3. The method of claim 2, wherein the profile data includes a two-dimensional (2D) and/or a three-dimensional (3D) imaging data representative of one or more surfaces orthogonal to the surface represented in the image data of the object located at the start location.

4. The method of claim 1, further comprising:
determining that the object is an unrecognized object based on comparing the image data to registration data representative of known objects; and
wherein:
the event is detected based on determining that the object is unrecognizable, and
the event represents the entry of the unrecognized object relative to the laterally-oriented crossing reference located above and overlapping the task location.

5. The method of claim 4, wherein the event corresponds to a trigger for operating the end-effector to release the unrecognized object.

6. The method of claim 4, wherein the event represents the entry or the exit of the unrecognized object relative to the laterally-oriented crossing reference located above a release trigger height.

7. The method of claim 1, wherein:
determining that the object is an unrecognized object based on comparing the image data to registration data representative of known objects; and
wherein:
the event is detected based on determining that the object is unrecognizable, and
the event represents the exit of the unrecognized object relative to the laterally-oriented crossing reference located above and overlapping the start location.

8. The method of claim 7, wherein detecting the event includes detecting the event contemporaneously corresponding to the operations for lifting the unrecognized object from the start location.

9. The method of claim 7, wherein detecting the event includes detecting the event after operations for gripping the unrecognized object.

10. The method of claim 9, wherein detecting the event includes activating a sensor corresponding to the laterally-oriented crossing reference.

11. The method of claim 9, further comprising:
tracking an end-effector location contemporaneously with the operations that transfer the unrecognized object, wherein the end-effector location corresponds to a set of coordinate values; and
wherein:
the gripper height corresponds to a vertical coordinate value for the end-effector location; and
detecting the event includes ignoring an initial state when the gripper height is below the reference height and/or when horizontal coordinate values of the end-effector location are outside of a boundary associated with the start location, wherein the initial state represents one or more outputs from a sensor corresponding to the laterally-oriented crossing reference.

12. The method of claim 11, further comprising:
identifying an external state during the operation, wherein the external state represents the end-effector location being outside of the boundary;
identifying an approach state during the operation, wherein the approach state represents the end-effector location being within the boundary and below the reference height; and
wherein:
ignoring the initial state includes ignoring the initial state during the external state and/or the approach state.

13. A robotic system comprising:
at least one processor; and
at least one memory device connected to the at least one processor and having stored thereon instructions executable by the processor for:
receiving an image data representative of a surface of an object located at a start location;
determining a minimum viable region based on the image data for gripping and lifting the object;
obtaining data representative of the object after implementation of an initial lift based on the minimum viable region to vertically displace the object;
implementing operations to transfer the object to a task location;
detecting an event during implementation of the operation, wherein the event represents (1) an entry or an exit of the object relative to a laterally-oriented crossing reference located at a crossing reference height and (2) an output from a crossing sensor configured to detect optical signals transmitted along a line or a plane corresponding to the laterally oriented crossing reference;
determining a gripper height corresponding to the event, wherein the gripper height represents a vertical location of an end-effector;
calculating an object height of the object based on the event, the gripper height, and/or the predetermined reference height; and
creating new registration data representative of the object, wherein the new registration data includes the object height.

14. A tangible, non-transient computer-readable medium having processor instructions stored thereon that, when executed by a robotic system via one or more processors thereof, cause the robotic system to perform a method, the method comprising:
receiving an image data representative of a surface of an object located at a start location;
determining a minimum viable region based on the image data for gripping and lifting the unrecognized object;
obtaining data representing the object after implementation of an initial lift based on the minimum viable region to vertically displace the object;
implementing operations to transfer the object to a task location;
detecting an event and a corresponding time stamp while implementing the operation, wherein the event represents (1) an entry or an exit of the unrecognized object relative to a laterally-oriented crossing reference located at a crossing reference height and (2) an output from a crossing sensor configured to detect optical signals transmitted along a line or a plane corresponding to the laterally oriented crossing reference;

determining a gripper height corresponding to the event, wherein the gripper height represents a vertical location of an end-effector;

calculating a height of the object based on the event, the gripper height corresponding to the event, and/or the predetermined reference height; and creating new registration data representative of a new record for the object, wherein the new registration data includes the height of the object.

15. The tangible, non-transient computer-readable medium of claim 14 having processor instructions stored thereon that cause the robotic system to perform the method, the method further comprising obtaining profile data based on the event, wherein the profile data represents an output from a laterally-facing sensor configured to obtain information regarding a vertical edge, a vertical surface, or a combination thereof of the object.

16. The tangible, non-transient computer-readable medium of claim 14 having processor instructions stored thereon that cause the robotic system to perform the method, the method further comprising:

determining that the object is an unrecognized object based on comparing the image data to registration data representative of known objects; and wherein:

the event is detected based on determining that the object is unrecognizable, and the event represents the entry of the unrecognized object relative to the laterally-oriented crossing reference located above and overlapping the task location.

17. The tangible, non-transient computer-readable medium of claim 14 having processor instructions stored thereon that cause the robotic system to perform the method, the method further comprising:

determining that the object is an unrecognized object based on comparing the image data to registration data representative of known objects; and wherein:

the event is detected based on determining that the object is unrecognizable, and the event represents the exit of the unrecognized object relative to the laterally-oriented crossing reference located above and overlapping the start location.

18. The robotic system of claim 13, wherein the at least one memory device further includes instructions for obtaining profile data based on the event, wherein the profile data represents an output from a laterally-facing sensor configured to obtain information regarding a vertical edge, a vertical surface, or a combination thereof of the object.

19. The robotic system of claim 13, wherein the at least one memory device further includes instructions for:

determining that the object is an unrecognized object based on comparing the image data to registration data representative of known objects; and wherein:

the event is detected based on determining that the object is unrecognizable, and the event represents the entry of the unrecognized object relative to the laterally-oriented crossing reference located above and overlapping the task location.

20. The robotic system of claim 13, wherein the at least one memory device further includes instructions for:

determining that the object is an unrecognized object based on comparing the image data to registration data representative of known objects; and wherein:

the event is detected based on determining that the object is unrecognizable, and the event represents the exit of the unrecognized object relative to the laterally-oriented crossing reference located above and overlapping the start location.

\* \* \* \* \*